United States Patent
Akiyama et al.

(10) Patent No.: US 12,479,058 B2
(45) Date of Patent: Nov. 25, 2025

(54) PROCESSING MACHINE, MEASURING DEVICE, AND METHOD FOR MANUFACTURING OBJECT TO BE PROCESSED

(71) Applicant: SHIBAURA MACHINE CO., LTD., Tokyo (JP)

(72) Inventors: Takanobu Akiyama, Shizuoka (JP); Yu Murofushi, Shizuoka (JP)

(73) Assignee: SHIBAURA MACHINE CO., LTD.

( * ) Notice: Subject to any disclaimer, the term of this patent is extended or adjusted under 35 U.S.C. 154(b) by 218 days.

(21) Appl. No.: 18/027,841

(22) PCT Filed: Sep. 21, 2021

(86) PCT No.: PCT/JP2021/034520
§ 371 (c)(1),
(2) Date: Mar. 22, 2023

(87) PCT Pub. No.: WO2022/065283
PCT Pub. Date: Mar. 31, 2022

(65) Prior Publication Data
US 2023/0356346 A1    Nov. 9, 2023

(30) Foreign Application Priority Data
Sep. 25, 2020   (JP) ................. 2020-160428

(51) Int. Cl.
*B23Q 17/24*    (2006.01)
*G05B 19/402*    (2006.01)
*G06T 7/70*    (2017.01)

(52) U.S. Cl.
CPC ....... *B23Q 17/2428* (2013.01); *G05B 19/402* (2013.01); *G06T 7/70* (2017.01)

(58) Field of Classification Search
CPC ........ B23Q 7/2428; G06T 7/70; G05B 19/402
See application file for complete search history.

(56) References Cited

U.S. PATENT DOCUMENTS

2001/0017699 A1    8/2001 Egelhof
2002/0189120 A1    12/2002 Kaneda et al.
(Continued)

FOREIGN PATENT DOCUMENTS

JP    H06-137842    5/1994
JP    2004-03259    2/2004
(Continued)

OTHER PUBLICATIONS

Japanese Office Action in Application No. 2020-160428, dated Aug. 29, 2023.
(Continued)

*Primary Examiner* — Mishawn N. Hunter
(74) *Attorney, Agent, or Firm* — DLA Piper LLP (US)

(57) ABSTRACT

A processing machine includes a drive source, a camera, an image processing device and a control device. The drive source makes a workpiece and a tool relatively move in a first direction. The camera captures the tool in the first direction to acquire an image. The image processing device identifies a position of the tool in the first direction based on clarity of the tool in the image. The control device controls the first drive source based on the position of the tool in the first direction identified by the image processing device.

20 Claims, 11 Drawing Sheets

(56) References Cited

U.S. PATENT DOCUMENTS

| | | | |
|---|---|---|---|
| 2013/0090755 A1* | 4/2013 | Kiryu | G05B 19/4069 |
| | | | 700/186 |
| 2013/0192054 A1 | 8/2013 | Sato | |
| 2014/0273068 A1 | 9/2014 | Wanders et al. | |
| 2016/0154398 A1* | 6/2016 | Yamaguchi | G05B 19/423 |
| | | | 700/170 |
| 2019/0061088 A1* | 2/2019 | Ootou | B23Q 17/2409 |
| 2020/0282588 A1* | 9/2020 | Rusch | B25F 5/021 |

FOREIGN PATENT DOCUMENTS

| | | |
|---|---|---|
| JP | 2006-289608 | 10/2006 |
| JP | 2013-174549 | 9/2013 |
| JP | 2015-182159 | 10/2015 |
| JP | 2016-520807 | 7/2016 |
| JP | 2017-167704 | 9/2017 |
| JP | 2018-051725 | 4/2018 |
| KR | 20130047754 A | 5/2013 |

OTHER PUBLICATIONS

International Search Report in Application No. PCT/JP2021/034520, dated Nov. 22, 2021.
Written Opinion of the International Search Report in Application No. PCT/JP2021/034520, dated Nov. 22, 2021.
Office Action for Korean Patent Application No. 10-2023-7013509, mailed Aug. 6, 2025, 12 pages.

* cited by examiner

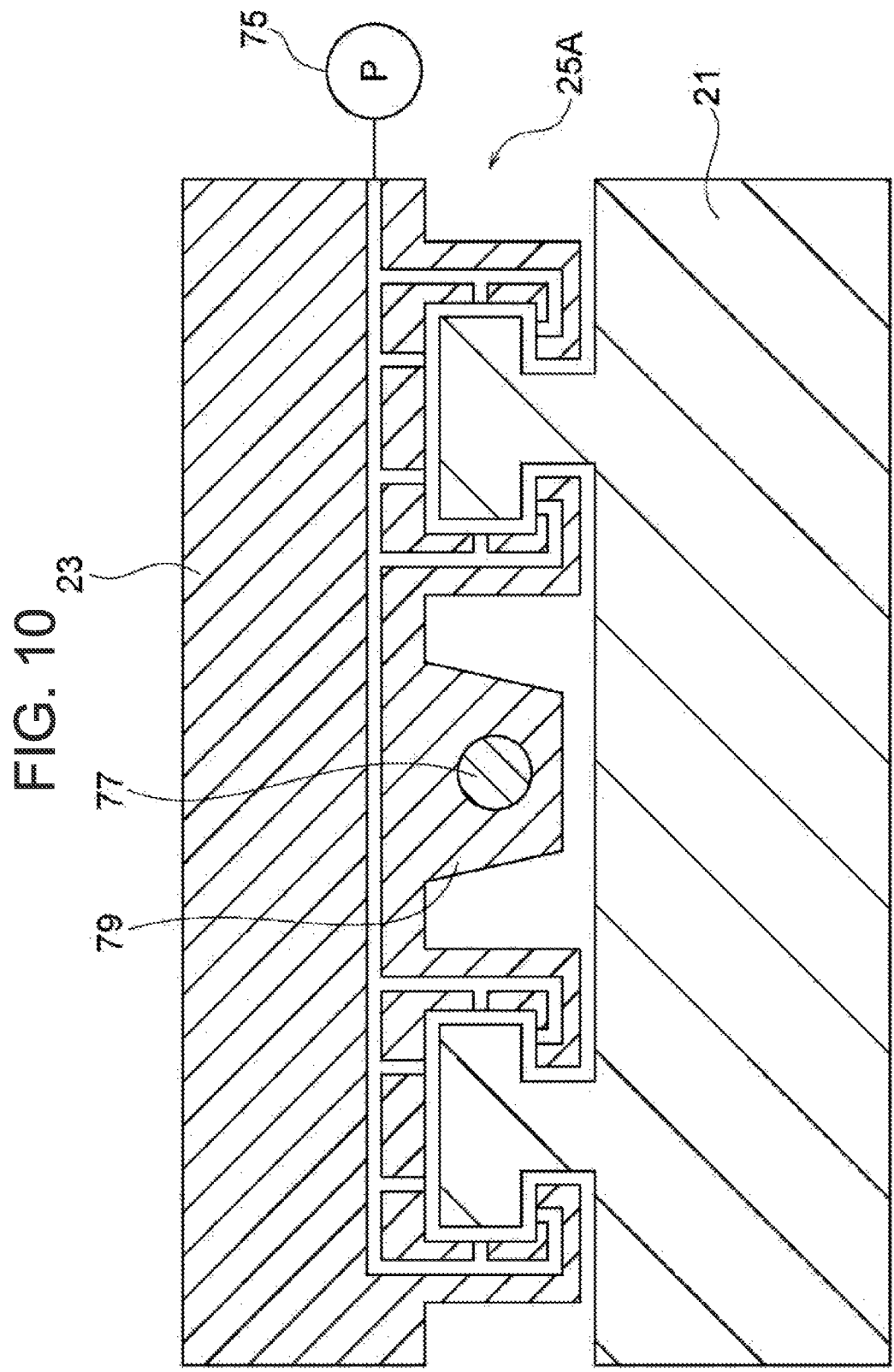

PROCESSING MACHINE, MEASURING DEVICE, AND METHOD FOR MANUFACTURING OBJECT TO BE PROCESSED

CROSS REFERENCE TO RELATED APPLICATIONS

This application is a U.S. National Stage Application of International Application No. PCT/JP2021/034520 filed Sep. 21, 2021, which claims priority from Japan Patent Application No. 2020-160428 filed Sep. 25, 2020. The entirety of all the above-listed applications are incorporated herein by reference.

TECHNICAL FIELD

The present disclosure relates to a processing machine, a measuring device, and a method for manufacturing a processed object.

BACKGROUND ART

Known in the art is a processing machine for processing a workpiece by a tool, which captures an image of the tool to thereby measure the position of the tool (for example, PTL 1 and PTL 2). PTL 1 discloses a technique of correcting relative movements of the tool and the workpiece when processing the workpiece in accordance with an amount of deviation between the position of the tool which is measured and the position of the tool which is set in advance. Further, PTL 1 discloses a technique of monitoring the state of a machine tool at the time of processing to thereby suitably set the measurement timing of the position of the tool. PTL 2 discloses a technique of using two illumination devices and a reflection mirror to thereby capture images of a tool from different directions by a single camera.

CITATION LIST

Patent Literature

PTL 1: Japanese Patent Publication No. 2018-51725
PTL 2: Japanese Patent Publication No. 2015-182159

SUMMARY OF INVENTION

Technical Problem

The position of a tool which can be measured by capturing an image of the tool is the position in a direction (direction along the image) perpendicular to the imaging direction (direction from the camera to the tool). Explained in reverse, the position of the tool in the imaging direction cannot be measured. Accordingly, for example, in a case where the position of the tool is measured in three-dimensional coordinates, two cameras which capture images of the tool from mutually different directions become necessary. As a result, for example, the cost of the processing machine increases. PTL 2 discloses a technique of capturing images of a tool from different directions by one camera. However, a complex mechanism is necessary.

A processing machine, a measuring device, and a method for manufacturing a processed object which are able to measure the position of a tool in the imaging direction have been awaited.

Solution to Problem

A processing machine according to one aspect of the present disclosure includes a first drive source which makes a workpiece and a tool relatively move in a first direction, a camera which captures the tool in the first direction to acquire an image, an image processing device which identifies a position of the tool in the first direction based on clarity of the tool in the image, and a control device which controls the first drive source based on the position of the tool in the first direction identified by the image processing device.

A processing machine according to one aspect of the present disclosure includes a first drive source which makes a workpiece and a tool relatively move in a first direction, a touch sensor which is arranged at a position having a certain positional relationship with respect to the position at which the tool is arranged and is relatively moved in the first direction relative to the workpiece by the first drive source by its arrangement at the position having the certain positional relationship, a camera which captures the touch sensor in the first direction to acquire an image, an image processing device which identifies the position of the touch sensor in the first direction based on clarity of the touch sensor in the image, and a control device which controls the first drive source based on the position of the touch sensor in the first direction identified by the image processing device.

A measuring device according to one aspect of the present disclosure is a measuring device measuring a position of a tool which relatively moves in a first direction relative to a workpiece, includes a camera which captures the tool in the first direction to acquire an image and an image processing device which identifies a position of the tool in the first direction based on clarity of the tool in the image.

A method for manufacturing a processed object according to one aspect of the present disclosure includes a step of using the processing machine to make the workpiece and the tool contact each other to process the workpiece into the processed object.

Advantageous Effect of Invention

According to the above configuration or procedure, measurement of the position in an imaging direction is possible.

BRIEF DESCRIPTION OF DRAWINGS

FIG. 10 is a view showing another example of the configuration different from the example of the configuration concerning a guide explained with reference to FIG. 2B.

DESCRIPTION OF EMBODIMENTS

The structure of the processing machine according to one embodiment may be, for example, a known structure or one applying a known structure except for the point that only one imaging part is illustrated as the imaging parts which will be explained later. Further, the control of the processing machine according to the embodiment may be, for example, a known control or one applying a known control except for processing relating to identification of the position of the tool based on the image captured by the imaging part.

Below, first, the configuration (mainly the structure) of the portion excluding the imaging part in the processing machine will be illustrated. Next, the structure of the imaging part will be illustrated. Next, the control of the processing machine (mainly the basic configuration and basic operation) will be illustrated. After that, an example of processing relating to identification of the position of the tool based on the image captured by the imaging part will be explained.

In the following explanation, for convenience, sometimes the image and the image data will not be strictly differentiated. Mainly, the term "image" will be used. The term "image" may be replaced by the term "image data" unless particularly explained otherwise or unless a contradiction etc. arises. Further, the term "position of the tool" sometimes designates the position relative to the workpiece. Further, it sometimes designates the position in an absolute coordinate system. Unless particularly explained otherwise or unless a contradiction etc. arises, the position of the tool may be grasped as either of the relative position and absolute position.

(Overall Configuration of Processing Machine)

Figure 1:
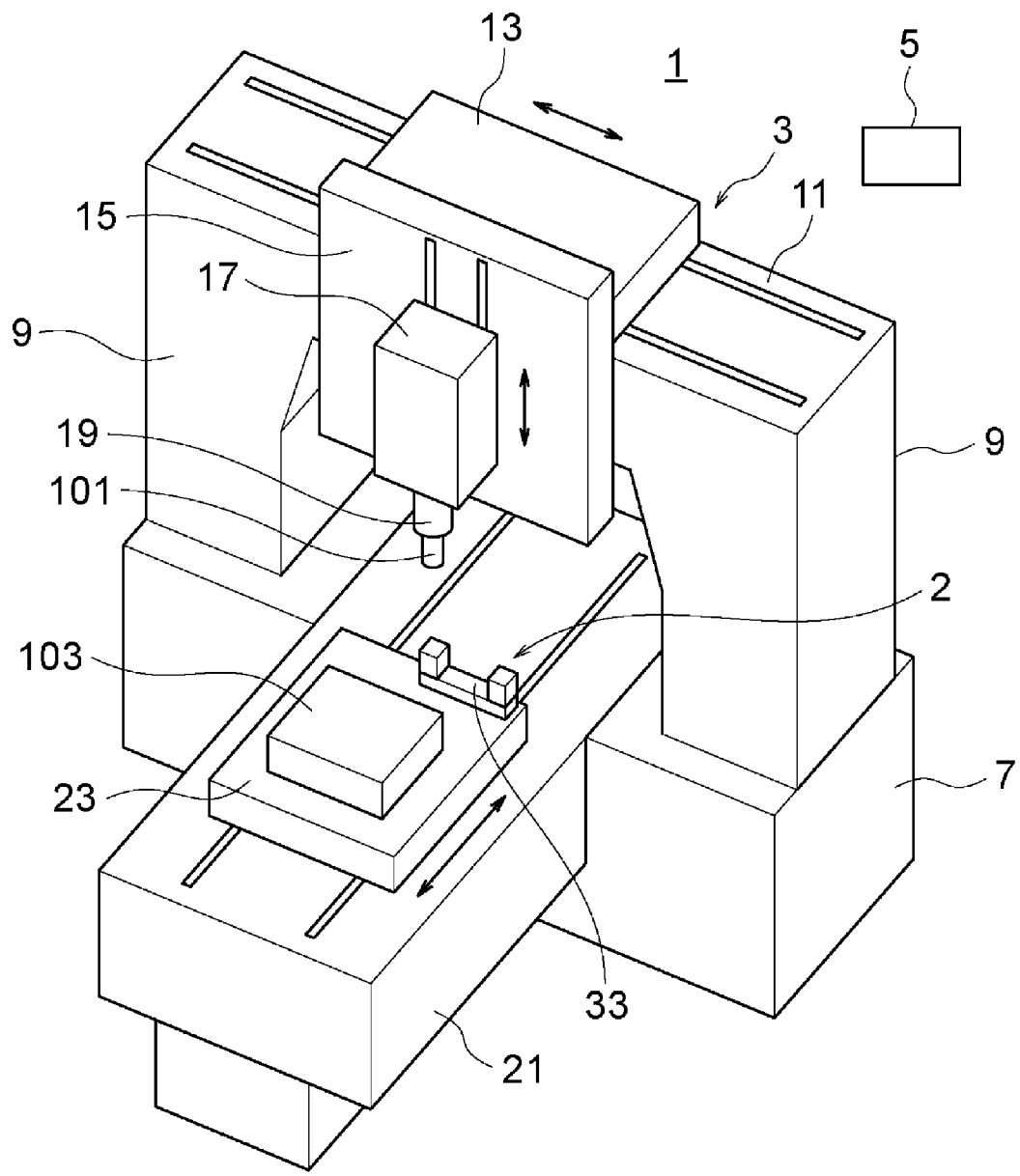
FIG. 1 is a schematic perspective view showing the configuration of a processing machine according to an embodiment.

FIG. 1 is a schematic perspective view showing the configuration of a processing machine 1 according to the embodiment. To the figure, for convenience, an orthogonal coordinate system XYZ is attached. The +Z direction is, for example, vertically upward.

As already explained, the technique according to the present disclosure can be applied to various processing machines. The illustrated processing machine 1 is in the end just one example. In the following explanation, however, for convenience, sometimes the explanation will be given predicated on the configuration of the processing machine 1.

The processing machine 1, for example, performs processing of a workpiece 103 by a tool 101. The type of processing (from another viewpoint, the type of the tool) may be a suitable one. For example, the type of processing is cutting, grinding, or polishing. In the example shown, the tool 101 is configured by an end mill or another rotating tool and is rotated about an axis parallel to the Z-axis. Further, the tool 101 and the workpiece 103 can relatively move in each of the X-axis, Y-axis, and Z-axis. Further, the rotating tool 101 is made to abut against the workpiece 103 to perform cutting, grinding, or polishing of the workpiece 103.

The processing machine 1, for example, has a machine body 3 which holds the tool 101 and workpiece 103, and a control unit 5 which controls the machine body 3.

The machine body 3, for example, makes the tool 101 rotate as explained above and makes the tool 101 and the workpiece 103 relatively move in three axial directions. The configuration which realizes such rotation and relative movement may be made, for example, the same as various known configurations or one applying the known configurations. In the example shown, this is as follows.

The machine body 3 has a base 7, two columns 9 which are supported upon the base 7, cross rails 11 which bridge the two columns 9, a saddle 13 supported upon the cross rails 11, a Y-axis bed 15 fixed to the saddle 13, a spindle head 17 supported by the Y-axis bed 15, and a spindle 19 supported by the spindle head 17.

The tool 101 is held by the spindle 19. The spindle 19 is supported rotatably about an axis parallel to the Z-axis by the spindle head 17 and is driven to rotate by a not shown spindle motor. Due to this, the tool 101 rotates. The spindle head 17 is able to linearly move in the Z-direction relative to the Y-axis bed 15 (saddle 13). Due to this, the tool 101 is driven in the Z-direction. The saddle 13 is able to linearly move in the Y-direction relative to the cross rails 11. Due to this, the tool 101 is driven in the Y-direction.

Further, the machine body 3 has an X-axis bed 21 supported by the base 7 and a table 23 supported upon the X-axis bed 21.

The workpiece 103 is held upon the table 23. The table 23 is able to linearly move in the X-direction relative to the X-axis bed 21. Due to this, the workpiece 103 is driven in the X-direction.

The configuration of the mechanism for realizing movement of the saddle 13, movement of the spindle head 17, movement of the table 23, and rotation of the spindle 19 may be a known configuration or one applying a known configuration. For example, the drive source may be an electric motor, hydraulic equipment, or pneumatic equipment. Further, the electric motor may be a rotary motor or linear motor. A linear guide which guides the saddle 13, spindle head 17, or table 23 (from another viewpoint, restricts movement in a direction other than the driving direction) may be a sliding guide by which a movable part and a fixed part slide, may be a rolling guide by which a rolling body rotates between the movable part and the fixed part, may be a static pressure guide by which air or oil is interposed between the movable part and the fixed part, or may be a combination of two or more among them. In the same way, the bearing of the spindle 19 may be a sliding bearing, rolling bearing, static pressure bearing, or combination of two or more among them.

The control unit 5, for example, although not particularly shown, is configured including a computer and driver (for example, servo driver). The computer may configure an NC (numerical control) device. The computer, for example, although not particularly shown, is configured including a CPU (central processing unit), ROM (read only memory), RAM (random access memory), and external storage device. By the CPU running a program stored in the ROM and/or external storage device, various types of function parts performing control etc. are constructed. The control unit 5 may include a logical circuit which performs only certain operations as well.

The control unit 5, for example, controls the rotation speed of the spindle 19 (from another viewpoint, for example, a not shown spindle motor) and controls the positions and speeds of the saddle 13, spindle head 17, and table 23. The position control may be so-called full closed loop control. That is, the detection positions of the saddle 13, spindle head 17, and table 23 may be fed back. However, the position control may be made semi-closed loop control where the rotation position of the electric motor is fed back or may be made open loop control without feedback. For the speed control as well, in the same way, full closed loop control, semi-closed loop control, or open loop control may be carried out.

In a case where full closed feedback control is carried out as described above, the configurations of the sensors which detect the positions and/or speeds of the members (13, 17, and 23) of the final control targets may be known configurations or ones applying known configurations. For example, the sensors may be linear encoders or laser length measuring devices. Further, in a case where semi-closed loop control is carried out, the sensor which detects the rotation position and/or rotation speed of the electric motor may be a known configuration or one applying a known configuration. For example, the sensor may be an encoder or resolver.

The processing precision of the processing machine 1 may be suitably set. For example, the processing machine 1 may be one capable of realizing processing by a precision of a submicrometer order (error less than 1 μm) or precision of a nanometer order (error less than 10 nm). Such a machine tool has already put into a practical use by the assignee of the present application (for example, UVM Series, ULG Series, and ULC Series). In more detail, for example, the positioning precision in the Y-direction of the saddle 13, positioning precision in the Z-direction of the spindle head 17, and/or positioning precision in the X-direction of the table 23 may be made 1 μm or less, 0.1 μm or less, 10 nm or less, or 1 nm or less. Naturally, the processing precision of the processing machine 1 may be lower than those described above as well.

(Movement Mechanism)

As already explained, the configuration for moving the saddle 13, spindle head 17, and table 23 on straight lines may be a suitable configuration. One example will be shown below.

Figure 2A:
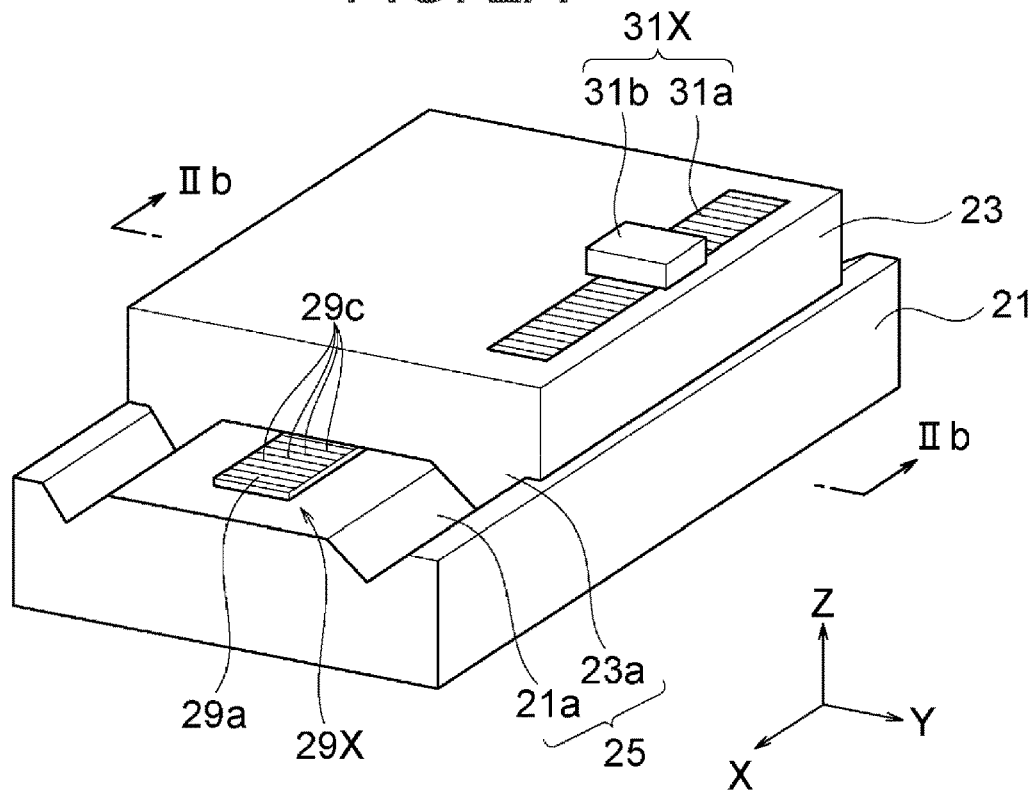
FIG. 2A is a perspective view showing an example of a configuration for making a table of the processing machine in FIG. 1 linearly move.
Figure 2B:
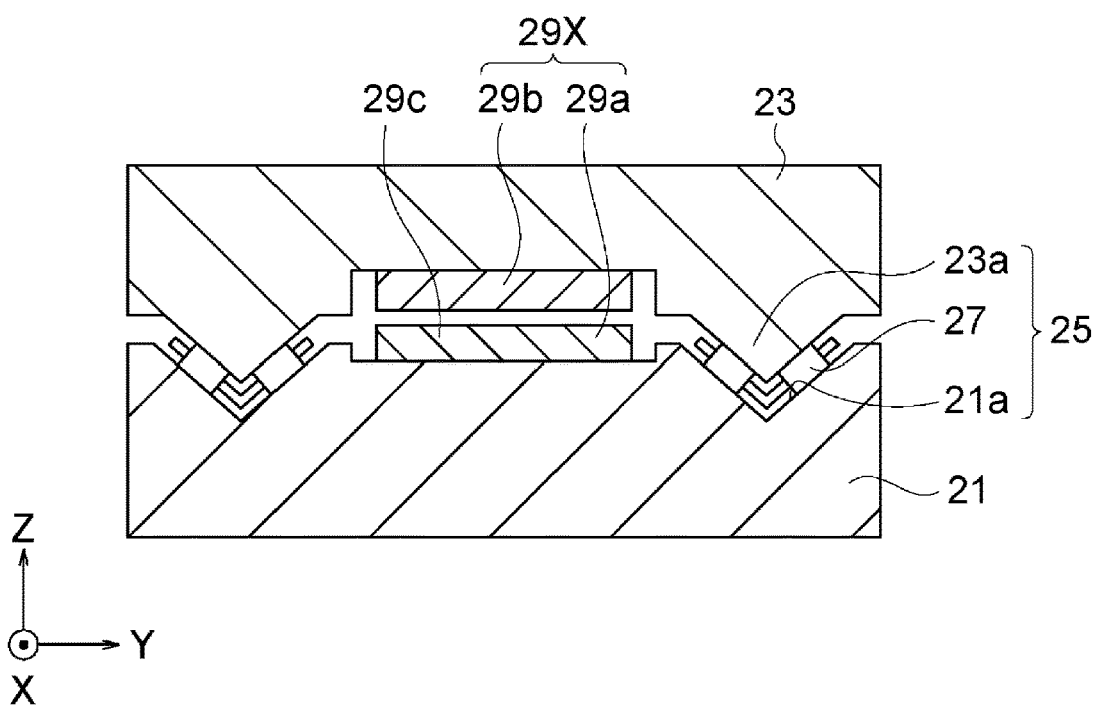
FIG. 2B is a cross-sectional view taken along the II-II line in FIG. 2A.

FIG. 2A is a perspective view showing an example of the configuration for linearly moving the table 23. FIG. 2B is a cross-sectional view taken along the II-II line in FIG. 2A.

In the example shown, a guide 25 which guides the table 23 is configured by a V-V rolling guide. For example, the guide has two grooves 21a having V-shaped cross-sections which are formed in the upper surface of the X-axis bed 21 supporting the table 23, two projections 23a having triangular cross-sections which are formed on the lower surface of the table 23, and a plurality of rollers 27 (rolling bodies) which are interposed between the grooves 21a and the projections 23a. The grooves 21a and the projections 23a linearly extend in the X-direction. The projections 23a fit in the grooves 21a through the rollers 27. Due to this, the table 23 is restricted in movement in the Y-direction. Further, the rollers 27 roll on the inner surface of the grooves 21a and the outer surface of the projections 23a and thereby permit the relative movements of the two in the X-direction. Due to this, the table 23 moves in the X-direction with a relatively small resistance. The movement of the table 23 toward the +Z side is, for example, restricted due to the weight. The movement of the table 23 toward the −Z side is, for example, restricted by the reaction force from the X-axis bed 21.

Further, in the example shown, the X-axis drive source 29X which drives the table 23 is configured by a linear motor. For example, the X-axis drive source 29X has a magnet row 29a formed by a plurality of magnets 29c which are arranged in the X-direction on the upper surface of the X-axis bed 21, and a coil 29b which is fixed to the lower surface of the table 23 and faces the magnet row 29a. Further, by supply of AC power to the coil 29b, the magnet row 29a and the coil 29b generate a driving force in the X-direction. In turn, the table 23 moves in the X-direction.

The configuration for making the table 23 linearly move in the X-direction (in other words, the configuration for making the tool 101 and the workpiece 103 relatively move in the X-direction) was explained above. The above explanation may be cited for the configuration for making the saddle 13 linearly move in the Y-direction (in other words, the configuration for making the tool 101 and the workpiece 103 relatively move in the Y-direction) and the configuration for making the spindle head 17 linearly move in the Z-direction (in other words, the configuration for making the tool 101 and the workpiece 103 relatively move in the Z-direction). For example, the guide which guides the saddle 13 and spindle head 17 may be a V-V rolling guide. Separation of the projections (23a) from the grooves (21a) may be suitably restricted by provision of engagement members and the like. Further, the Y-axis drive source 29Y (FIG. 4) which drives the saddle 13 and the Z-axis drive source 29Z (FIG. 4) which drives the spindle head 17 may be configured by linear motors. Note that, in the following explanation, sometimes the X-axis drive source 29X, Y-axis drive source 29Y, and Z-axis drive source 29Z will be referred to as the "drive sources 29" without differentiation.

(Sensors)

As already explained, the sensors which detect the positions of the saddle 13, spindle head 17, and table 23 may be given suitable configurations. FIG. 2A becomes a view showing a linear encoder as one example of the same. Specifically, this is as follows.

The processing machine 1 has an X-axis sensor 31X which detects the position in the X-direction of the table 23. The X-axis sensor 31X, for example, has a scale part 31a extending in the X-direction and a detection part 31b facing the scale part 31a. In the scale part 31a, for example, a plurality of optically or magnetically formed patterns are arranged in the X-direction at a constant pitch. The detection part 31b generates signals in accordance with relative positions relative to the patterns. Accordingly, displacement (position) can be detected by counting the signal generated along with the relative movements of the scale part 31a and the detection part 31b (that is, counting the patterns).

One of the scale part 31a and the detection part 31b (scale part 31a in the example shown) is fixed to the table 23. The other of the scale part 31a and the detection part 31b (detection part 31b in the example shown) is directly or indirectly fixed with respect to the X-axis bed 21. Accordingly, when the table 23 moves, the scale part 31a and the detection part 31b relatively move. Due to this, the displacement (position) of the table 23 is detected.

The specific attachment positions of the scale part 31a and the detection part 31b may be suitably set. Further, the X-axis sensor 31X may be an absolute type capable of identifying the position (absolute position) of the detection part 31b relative to the scale part 31a based on the patterns of the scale part 31a or may be an incremental type unable to perform such identification. As is well known, even an incremental type scale can identify the absolute position by moving the detection part 31b to a predetermined position (for example, the movement limit) relative to the scale part 31*a* and performing calibration.

The X-axis sensor 31X which detects the position in the X-direction of the table 23 was explained. The above explanation may be cited for the Y-axis sensor 31Y (FIG. 4) which detects the position in the Y-direction of the saddle 13 and for the Z-axis sensor 31Z (FIG. 4) which detects the position in the Z-direction of the spindle head 17. Note that, in the following explanation, sometimes the X-axis sensor 31X, Y-axis sensor 31Y, and Z-axis sensor 31Z will not be differentiated and will be referred to the "sensors 31".

The X-axis sensor 31X detects the position (absolute position) of the table 23 in the X-direction. However, the X-axis sensor 31X may be grasped as detecting the relative positions of the workpiece 103 and the tool 101 in the X-direction. In the same way, the Y-axis sensor 31Y may be grasped as detecting the relative positions of the workpiece 103 and the tool 101 in the Y-direction. The Z-axis sensor 31Z may be grasped as detecting the relative positions of the workpiece 103 and the tool 101 in the Z-direction.

(Imaging Part)

As shown in FIG. 1, the processing machine 1 has an imaging part 33 which captures the tool 101. The imaging part 33 is, for example, fixed to the table 23. In other words, the imaging part 33 is fixed with respect to the workpiece 103 and in turn is arranged at a position relatively moving relative to the tool 101 along with the relative movements of the tool 101 and the workpiece 103.

At a suitable timing, the processing machine 1 performs positioning of the tool 101 and the workpiece 103 (imaging part 33) at the predetermined positional relationship based on the detection values of the sensors 31 and captures the tool 101 by the imaging part 33. Further, for example, by comparing the image which was captured before and the image which is captured this time, deviation between the previous position of the tool 101 and the present position of the tool 101 is detected. This deviation, for example, occurs due to the rise of the temperature of the processing machine 1 and deformation of the parts in the processing machine 1. The processing machine 1 corrects the control of the drive sources 29 based on the sensors 31 based on the detected deviation. Note that, such detection of deviation of the position of the tool may be grasped as one type of detection of the position of the tool, and the control based on the deviation of the position of the tool may be grasped as one type of control based on the position of the tool.

The specific arrangement position of the imaging part 33 with respect to the table 23 may be suitably set. For example, the imaging part 33 may be positioned at the outer peripheral portion of the table 23 or may be positioned on a not shown additional table fixed to the table 23. Further, the imaging part 33 may be positioned on any side on the +X side, −X side, +Y side, and −Y side among the four sides of the substantially rectangular shaped table 23. Further, the imaging part 33 may be positioned at the end part side of the one side at which the imaging part 33 is located (corner portion side of the table) or may be positioned at the center of the one side.

Figure 3:
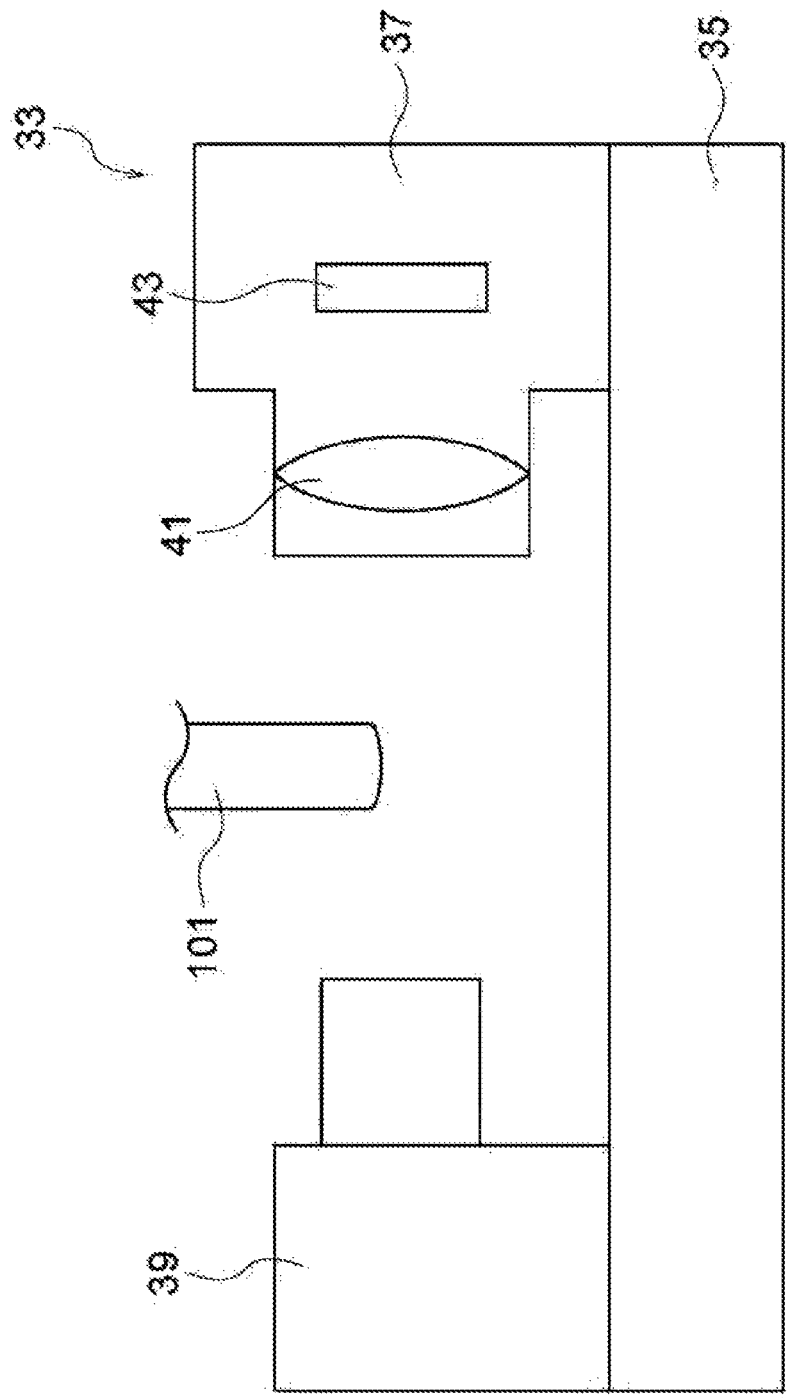
FIG. 3 is a schematic view showing the configuration of an imaging part in the processing machine in FIG. 1.

FIG. 3 is a schematic view showing an example of the configuration of the imaging part 33.

The imaging part 33 has, for example, a support member 35, a camera 37 fixed on the support member 35, and an illumination device 39 fixed on the support member 35 and facing the camera 37. The tool 101 positioned between the illumination device 39 and the camera 37 is captured by the camera 37.

The direction capturing the tool 101 (imaging direction) by the imaging part 33 (camera 37) may be any direction. In the example shown, an aspect where the imaging direction is the Y-direction is illustrated. The Y-direction, in the present embodiment, is the direction perpendicular with respect to the axial direction of the tool 101 (from another viewpoint, spindle 19), is a direction in which the tool 101 and the workpiece 103 can relatively move, and a direction in which the tool 101 (may be the workpiece 103 as well) is guided.

The imaging direction may also be the X-direction to which the explanation for the Y-direction given above can be applied in the same way as well. Further, the imaging direction may be the Z-direction as well. However, when the imaging direction is the Z-direction, in the present embodiment, it is difficult to arrange the illumination device 39 on the side opposite to the camera 37 relative to the tool 101. Further, the imaging direction may be a direction inclined with respect to the X-direction, Y-direction, and/or Z-direction. In this case, however, the various controls and processing for measuring the position of the tool become complex.

As described above, the imaging direction may be made any direction. In the explanation of the present embodiment, however, for convenience, sometimes the explanation will be made predicated on the imaging direction being the Y-direction. In more detail, sometimes the explanation will be given predicated on an aspect where the camera 37 captures the tool 101 from the +Y side of the tool 101.

The support member 35 contributes to fixation of the camera 37 and illumination device 39 with respect to the table 23. Further, it contributes to restriction of the relative positions of the camera 37 and the illumination device 39. The shape, dimensions, and material of the support member 35 may be suitably set. Further, the support member 35 may be omitted as well. That is, the camera 37 and the illumination device 39 may be directly fixed to the table 23 as well.

The camera 37, for example, has a lens 41, an imager 43, and a housing accommodating them (notation is omitted). The lens 41 may be a single lens or may be a composite lens. As the material of the lens 41, there can be mentioned glass and plastic. The imager 43 is, for example, a solid-state image sensor. As the solid-state image sensor, there can be mentioned a CCD (charge coupled device) image sensor and CMOS (complementary metal oxide semiconductor) image sensor. The imager 43 is, for example, one having a high sensitivity with respect to visible light. However, the imager 43 may be one having a high sensitivity with respect to infrared rays, UV-rays, X-rays, etc. as well.

Note that, unlike the example shown, the lens 41 and the imager 43 (camera) need not be made integral by the housing. For example, a lens and imager which are separately distributed may be combined as well. Although not particularly shown, the camera 37 may have a driver which drives the imager 43 as well. The data of the image captured by the camera 37 is output to an external apparatus of the camera 37 (for example, personal computer) and is processed by the external apparatus. However, the camera 37 may have an image processing part which performs at least a portion of the processing of the image data as well. Such a processing part may be realized by, for example, an IC (integrated circuit). The camera 37 acquires, for example, a gray scale image. However, the camera 37 may acquire a color image as well. In other words, the camera 37 may have a color filter as well.

The illumination device 39, for example, contributes to clarification of the profiles of the tool 101 in the image captured by the camera 37. Specifically, the light from the illumination device 39 is blocked in part by the tool 101. The remaining portion passes the periphery of the tool 101 and is incident upon the camera 37. As a result, in the image captured by the camera 37, the brightness of the region on the outside of the tool 101 becomes higher than the brightness of the region of the tool 101. In turn, the profile of the tool 101 becomes clear.

The illumination device 39, although not particularly shown, has a light source which generates light. The light is, for example, visible light. However, the light may also be infrared rays, UV-rays, X-rays, etc. Further, the light may be one having a high directivity (for example, laser beam) or may be one which does not have a high directivity. The light source may be, for example, an LED (light emitting diode), laser, fluorescent light, or incandescent bulb. The illumination device 39 may include a lens converging the light from the light source as well.

(Configuration of Control System in Processing Machine)

Figure 4:
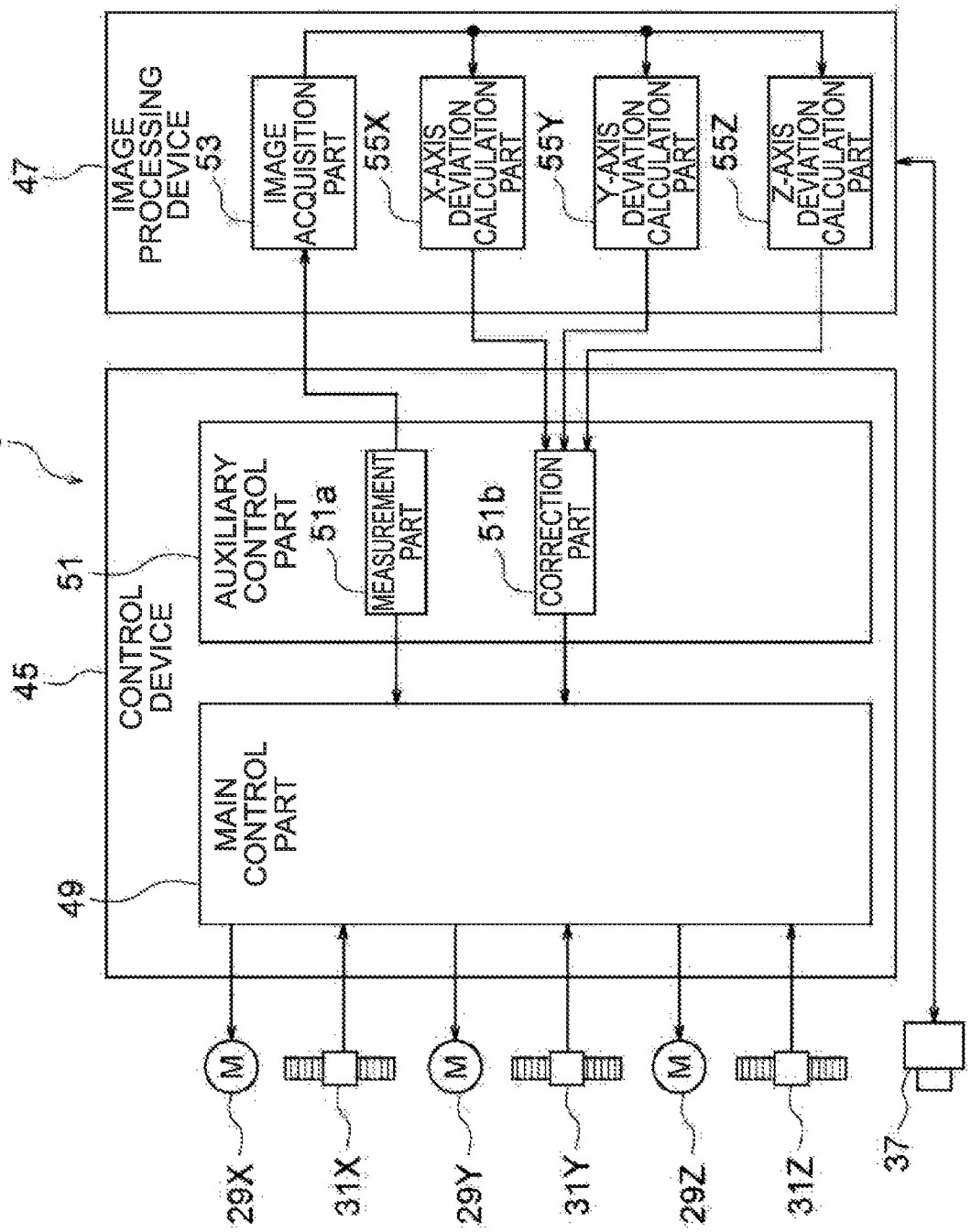
FIG. 4 is a block diagram showing the configuration of a control system in the processing machine in FIG. 1.

FIG. 4 is a block diagram showing an outline of the configuration of the control system in the processing machine 1. In more detail, here, the configuration relating to the control of relative movements of the tool 101 and the workpiece 103 in the orthogonal coordinate system XYZ is shown. That is, illustration of the configuration relating to the control of the rotation of the tool 101 and the like is omitted.

On the left end of the plane of FIG. 4, the drive sources 29 and sensors 31 relating to the relative movements of the tool 101 and the workpiece 103 in the orthogonal coordinate system XYZ are schematically shown, and the camera 37 is shown. Further, in the remaining part in FIG. 4, a block diagram showing various function parts constructed in the control unit 5 is shown.

The control unit 5, for example, has a control device which controls the machine body 3 in the processing machine 1 and an image processing device 47 which performs processing based on the image captured by the camera 37.

The control device 45, for example, has a main control part 49 which performs control directly concerned with the processing and an auxiliary control part 51 which performs processing for correcting the control of the main control part 49.

The main control part 49, for example, controls the operation of the machine body 3 based on the NC program. Further, from another viewpoint, the main control part 49 performs feedback control of the drive sources 29 based on the detection values of the sensors 31.

The auxiliary control part 51, for example, has a measurement part 51a which performs control for capturing the tool 101 by the imaging part 33 and a correction part 51b which corrects the control of the main control part 49 based on the captured image.

The measurement part 51a, for example, controls the machine body 3 (drive sources 29) so as to perform positioning of the tool 101 and the camera 37 with the predetermined positional relationship. Further, the measurement part 51a, for example, controls the camera 37 (imager 43) so that the tool 101 is captured. Note that, in the example shown, the measurement part 51a controls the drive sources 29 through the main control part 49. However, it may directly control the drive sources 29 as well. In the same way, in the example shown, the measurement part 51a controls the imager 43 through the image processing device 47. However, it may directly control the imager 43 as well.

The correction part 51b, for example, acquires the amount of deviation of the tool 101 from the image processing device 47 and corrects the control of the main control part 49 based on that acquired amount of deviation.

The amount of deviation of the tool 101 is, for example, as follows. The control device 45, for example, controls the drive sources 29 so as to move the tool 101 to the position (coordinates) of the tool 101 designated by the NC program based on the detection values of the sensors 31. This control is predicated on a certain correspondence being present between the position of the tool 101 and the detection values of the sensors 31. However, due to deformation of the processing machine 1 caused by a temperature change etc., sometimes the correspondence of the position of the tool and the detection values of the position sensors deviates from the above certain correspondence. The amount of this deviation may be grasped as the amount of deviation of the tool 101. Further, from another viewpoint, in the state where the detection values of the sensors 31 are the predetermined values, if the position of the tool 101 at the time of the above certain correspondence is defined as the reference position, the amount of deviation between this reference position and the actual position of the tool 101 is the amount of deviation of the tool 101. Note that, in the following explanation, for convenience, sometimes such an accurate expression will not be used.

The image processing device 47, for example, has an image acquisition part 53 which controls the camera 37 (imager 43) and acquires an image (strictly speaking, image data) of the tool 101, and calculation parts (55X, 55Y, and 55Z) which calculate the amount of deviation of the position of the tool 101 based on the acquired image. The calculation parts, in more detail, include an X-axis deviation calculation part 55X which calculates the amount of deviation of the tool 101 in the X-axis direction, Y-axis deviation calculation part 55Y which calculates the amount of deviation of the tool 101 in the Y-axis direction, and Z-axis deviation calculation part 55Z which calculates the amount of deviation of the tool 101 in the Z-axis direction.

The various function parts included in the control unit 5 are, for example, constructed by the computer running the program as already explained. The various function parts may be constructed in hardware which are different from each other or may be constructed in the same hardware. For example, the control device 45 and the image processing device 47 may be constructed in different computers and perform wired communication or wireless communications or may be constructed in the same computer. Further, for example, the main control part 49 and part (or all) of the auxiliary control part 51 may be constructed in different computers, and the above part (or all) of the auxiliary control part 51 and the image processing device 47 may be constructed in the same computer. Further, part of the function parts of the image processing device 47 may be built in the camera 37 as well. The image processing device 47 may just identify the position of the tool 101. Further, the control device 45 may identify the amount of deviation of the tool 101 by comparing the position of the tool 101 identified by the image processing device 47 and the reference position. That is, the deviation calculation parts (55X, 55Y, and 55Z) may be configured by the image processing device 47 and the control device 45. However, in the following explanation, for convenience, the image processing device 47 is expressed as identifying the amount of deviation.

The various function parts illustrated in FIG. 4 are convenient and conceptual parts for explaining the operation of the control unit 5. Accordingly, for example, in a program, the various function parts need not be differentiated either. Further, for example, one operation may be an operation by two or more function parts as well. For example, the processing for acquiring the profile of the tool 101 in the image may be grasped as the operations of the two of the X-axis deviation calculation part 55X and Z-axis deviation calculation part 55Z.

(One Example of Configuration of Control System in Each Axis)

Figure 5:
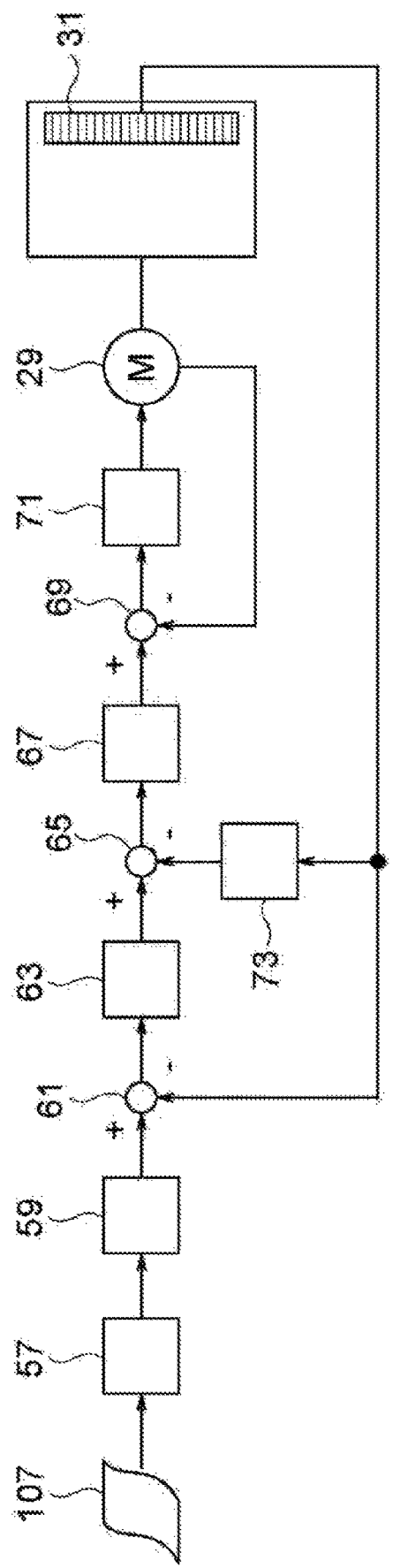
FIG. 5 is a view showing details of part of the block diagram in FIG. 4.

FIG. 5 is a block diagram showing an example of the configuration of the control system in each axis. From another viewpoint, it is a view showing details of part of the main control part 49. In the view, the portion excluding the NC program 107, drive sources 29, and sensors 31 corresponds to part of the main control part 49.

The NC program 107 includes information of commands relating to the drive of each axis. For example, the NC program 107 includes information of commands relating to movements of the table 23, saddle 13, and spindle head 17. The information of commands relating to movements, for example, includes a plurality of positions on a movement track, and information of the speed between the plurality of positions.

The interpretation part 57 reads out and interprets the NC program 107. Due to this, for example, information of a plurality of positions which are successively passed and the speed between the plurality of positions is acquired for each of the table 23, saddle 13, and spindle head 17.

The interpolation part 59 calculates the target position for each predetermined control cycle based on the information acquired by the interpretation part 57. For example, it sets a plurality of target positions to be reached between the two positions for each control cycle based on the two positions which are successively passed and the speed between those two positions. The interpolation part 59 calculates the target position for each control cycle for each axis and outputs the results to the addition part 61.

The configurations of the addition part 61 and the following parts are provided for each axis. That is, the main control part 49 has a total of three configurations shown on the right side of the drawing sheet from the addition part 61. Further, the configuration of the addition part 61 and on is, for example, the same as the known configuration relating to feedback control. Further, input of the target position for each control cycle from the interpolation part 59 to the addition part 61 explained above and the operation which will be explained below are repeatedly carried out in the control cycle.

In the addition part 61, the error between the target position for each control cycle and the position detected by the sensor 31 is calculated. The calculated error (target amount of movement for each control cycle) is input to the position control part 63. The position control part 63 multiplies the input error by a predetermined gain to calculate the target speed for each control cycle and outputs the result to the addition part 65. The addition part 65 calculates the error between the target speed for each control cycle which is input and a detection speed which is obtained by differentiation of the detection position of the sensor 31 by a differentiation part 73 and outputs the result to the speed control part 67. The speed control part 67 multiplies the input error by a predetermined gain to calculate the target current (target torque) for each control cycle and outputs the result to the addition part 69. The addition part 69 calculates an error between the target current for each control cycle which is input and the detection current from a not shown current detection part and outputs the result to the current control part 71. The current control part 71 supplies power in accordance with the input error to the drive sources 29.

The above description is in the end just one example and may be suitably modified. For example, although not particularly shown, feed forward control may be added as well. In place of the current loop, an acceleration loop may be inserted as well. If the drive source is a rotary electric motor and if a rotation sensor (for example, encoder or resolver) which detects its rotation is provided, speed control may be carried out based on the detection value of the rotation sensor as well.

(Method of Identification of Position of Tool Based on Image)

In the following description, the method of identification the amount of deviation of the tool 101 based on the image of the tool 101 captured by the camera 37 will be explained.

(Method of Identification of Position in Direction Perpendicular to Imaging Direction)

Figure 6:
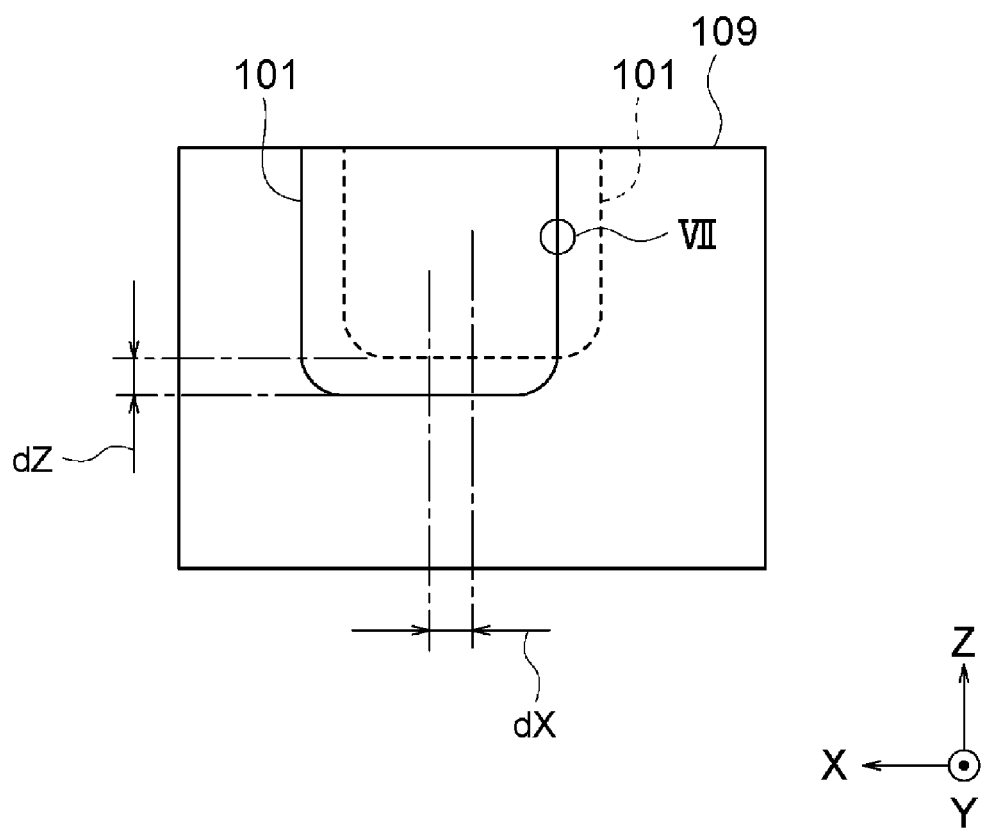
FIG. 6 is a schematic view showing an example of an image captured by a camera provided in the processing machine in FIG. 1.

FIG. 6 is a view for explaining the method of measurement of the amount of deviation of the position of the tool 101 in the directions perpendicular to the imaging direction (X-direction and Z-direction in the present embodiment). This view schematically shows an example of an image 109 captured by the camera 37.

The amount of deviation of the position of the tool 101 in the X-direction and Z-direction may be identified in the same way as a known method. For example, as already referred to, the tool 101 and the camera 37 are positioned with the predetermined positional relationship and the tool 101 is captured. The imaging is, for example, carried out at the reference timing (explained later) and one or more measurement timings (explained later) after that. Further, by comparing the position of the tool 101 (indicated by a dotted line in FIG. 6) in the image captured at the reference timing and the position of the tool 101 (indicated by a solid line in FIG. 6) in the image captured at the measurement timing, an amount of deviation dX in the X-direction and an amount of deviation dZ in the Z-direction can be identified. Further, the control of the main control part 49 is corrected based on the amounts of deviation dX and dZ.

Positioning of the relative positions of the tool 101 and the camera 37 for imaging may be suitably carried out. For example, the measurement part 51a controls three drive sources 29 so that the respective detection values of the three sensors 31 become the predetermined values. By this control, the tool 101 is, for example, positioned with its front end between the illumination device 39 and the camera 37. In other words, the front end of the tool 101 is positioned within the visual field of the camera 37. Further, the measurement part 51a drives the imager 43 to acquire the image of the tool 101.

In the positional relationship between the tool 101 and the camera 37 at the time of imaging for measuring the amounts of deviation of the position of the tool 101 in the X-direction and Z-direction, the position detected by the Y-axis sensor 31Y need not be strictly constant unlike the above explanation. For example, as will be explained later, in the measurement of the amount of deviation of the position of the tool 101 in the Y-direction, a plurality of images in which the relative positions of the tool 101 and the camera 37 in the Y-direction (from another viewpoint, the detection positions of the Y-axis sensor 31Y) are different from each other are acquired. Further, a focused image is selected from among those plurality of images. This selected image may be used as the image for measuring the amounts of deviation of the position of the tool 101 in the X-direction and Z-direction. In this case, the detection position of the Y-axis sensor 31Y when the image to be used is acquired, as will be understood from the explanation which will be given later, is one fluctuating in accordance with the amount of deviation of the tool 101 in the Y-direction and is not constant.

The image for identifying the amount of deviation dX and the image for identifying the amount of deviation dZ are, for example, the same image. However, the amounts of deviation dX and dZ may also be identified from images which are different from each other.

At the time of imaging, the tool 101 may be stopped from rotating or may be rotated. Further, in a mode where the imaging is carried out in the state where the rotation of the tool 101 is stopped, positioning in the rotation direction of the spindle 19 may be carried out or not be carried out. These conditions may be suitably set in accordance with wobbling, shape, etc. of the tool 101.

In FIG. 6, the tool 101 moves in parallel with respect to the Z-axis without inclination. The amounts of deviation dX and dZ are the same at all portions of the tool 101. However, in a case where the tool 101 is inclined, the amounts of deviation dX and dZ differ according to which position in the tool 101 is to be used as the reference for identifying the amounts of deviation dX and dZ. The position which becomes the reference may be suitably set in accordance with the type etc. of the tool 101. For example, it may be set at the center of the front end of the tool 101. The position which becomes the reference may be positioned substantially at the center of the visual field of the camera 37 at the reference timing or may be positioned at a position offset from the center.

At the time of identification of the amounts of deviation dX and dZ, various known image processing may be carried out. For example, at the time of identification of the profile of the tool 101, known edge detection may be carried out. The detection precision of the amounts of deviation dX and dZ may be suitably set. For example, in the image, the position of the tool 101 may be identified in pixel units, that is, the detection precision of the amounts of deviation dX and dZ may be a length corresponding to one pixel. Further, for example, by performing processing for estimating the edge position of the tool 101 from periphery information of the tool 101 in the image (sub-pixel processing), a detection precision of a length shorter than a length corresponding to 1 pixel may be realized. For example, the detection precision of the amounts of deviation dX and dZ may be a length corresponding to $1/1000$ pixel, $1/100$ pixel, or $1/10$ pixel.

The information of the correspondence between 1 pixel and an actual length corresponding to 1 pixel may be input by a manufacturer of the processing machine 1, may be input by an operator, or may be acquired by the processing machine 1 performing a predetermined operation. When it is acquired by the processing machine 1, for example, the processing machine 1 makes the tool 101 and the camera 37 relatively move in the X-direction (and/or Z-direction) by the X-axis drive source 29X (and/or Z-axis drive source 29Z) and at least acquires the image at two imaging positions. By comparing a distance between the two imaging positions detected by the X-axis sensor 31X (and/or Z-axis sensor 31Z) and the difference of positions (number of pixels) of the tool 101 between the two images at this time, the correspondence between 1 pixel and the actual length is identified.

(Method of Identification of Position in Imaging Direction)

In the measurement of the amount of deviation in the Y-direction, imaging by the camera 37 is carried out while changing the distance between the tool 101 and the camera 37 in the Y-direction by the Y-axis drive source 29Y (a plurality of images are acquired) to thereby acquire the detection position by the Y-axis sensor 31Y when it is focused. Such acquisition of the detection position is carried out at each of the reference timing and the measurement timing. On the other hand, the distance at the time of focusing is constant. Accordingly, the amount of deviation between the detection position at the reference timing and the detection position at the measurement timing can be defined as the amount of deviation of the tool 101 in the Y-direction.

When the tool 101 and the camera 37 are made to relatively move in the Y-direction to acquire the plurality of images as described above, the relative movements of the tool 101 and the camera 37 may be made intermittent ones where movement and stopping are repeated. Further, the imaging may be carried out at the time of stopping. In this case, for example, the clarity of the image can be improved. However, the relative movements may also be made continuous ones not including stopping and the imaging may be carried out during movement. The speeds of the relative movements may be any ones. At the time of imaging, the tool 101 may be stopped in rotation or may be rotated.

Further, the relative movements of the tool 101 and the camera 37 may be ones where the two members approach from a state where the two members are separated by a distance longer than the distance predicted to achieve focusing. Conversely, they may be ones where the two members are separated from a state where the two members are close by a distance shorter than the distance predicted to achieve focusing. Movements of the two may be included as well. The distance of the relative movements may be suitably set within a range larger than the maximum value predicted for the amount of deviation in the Y-direction of the tool 101.

The distance between the imaging positions at the time of imaging while making the tool 101 and the camera 37 relatively move will be referred to as the "pitch of the imaging position". If the depth of field etc. can be ignored, nominally, this pitch becomes the precision of measurement of the amount of deviation of the tool 101. However, if it is possible to select two imaging positions judged to be focused, by using an intermediate position of them as the position for focusing and the like, it is also possible to define a distance shorter than the pitch of the imaging position as the precision of measurement of the amount of deviation.

As will be explained later, focusing is judged by calculating a predetermined index value. At this time, a function for approximation of the correlation of the imaging position and the index value may be found, and an imaging position where the index value becomes the peak in this function may be identified as the imaging position for focusing. In this case, unlike the above description, the precision of the amount of deviation becomes smaller than the pitch of the imaging position (precision becomes high). However, in the following explanation, for convenience, mainly a mode where such processing is not carried out will be taken as an example.

The pitch of the imaging position may be, for example, made constant for all imaging positions. However, the pitch need not be constant. For example, in a case where the imaging is carried out for confirmation at a position where the distance from the position where focusing is predicted is long, the pitch between this imaging position and the adjacent imaging position may be made longer than the pitch between the other imaging positions.

The pitch of the imaging position may be changed in accordance with the circumstances. For example, first, imaging is carried out at a plurality of imaging positions set with a relatively large pitch within a first range in the Y-direction. Based on the imaging results, within the first range, a second range where focusing is predicted is identified. Next, the imaging is carried out at a plurality of imaging positions set with a relatively small pitch within the second range. Based on the imaging results, the position for focusing is finally decided.

The specific size of the pitch of the imaging positions may be suitably set in accordance with the processing precision etc. which are demanded from the processing machine 1. For example, the pitch may be the same as or larger than the positioning precision in the Y-direction in the processing machine 1. Further, for example, the pitch may be made 1 µm or less, 0.1 µm or less, 10 nm or less, or 1 nm or less. Further, for example, the pitch may be longer than, equal to, or shorter than the depth of field.

The mode of relative movements of the tool 101 and the camera 37 (movement direction, either of one-way or two-way, and the like), the range in the Y-direction in which a plurality of imaging positions are set, and/or the pitch of the imaging positions, and other various conditions may be set by the manufacturer of the processing machine 1 or may be set by an operator.

(Method of Judgment of Focusing)

Focusing can be judged according to, for example, the clarity of the image. Specifically, this is as follows.

Figure 7A:
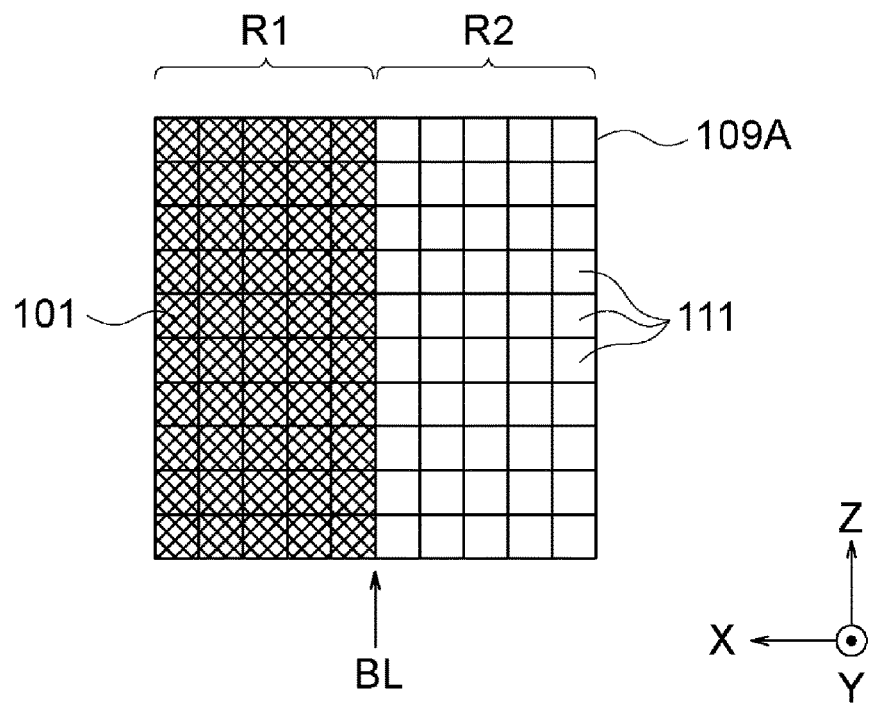
FIG. 7A and FIG. 7B are enlarged views showing an example of a region VII in FIG. 6.
Figure 7B:
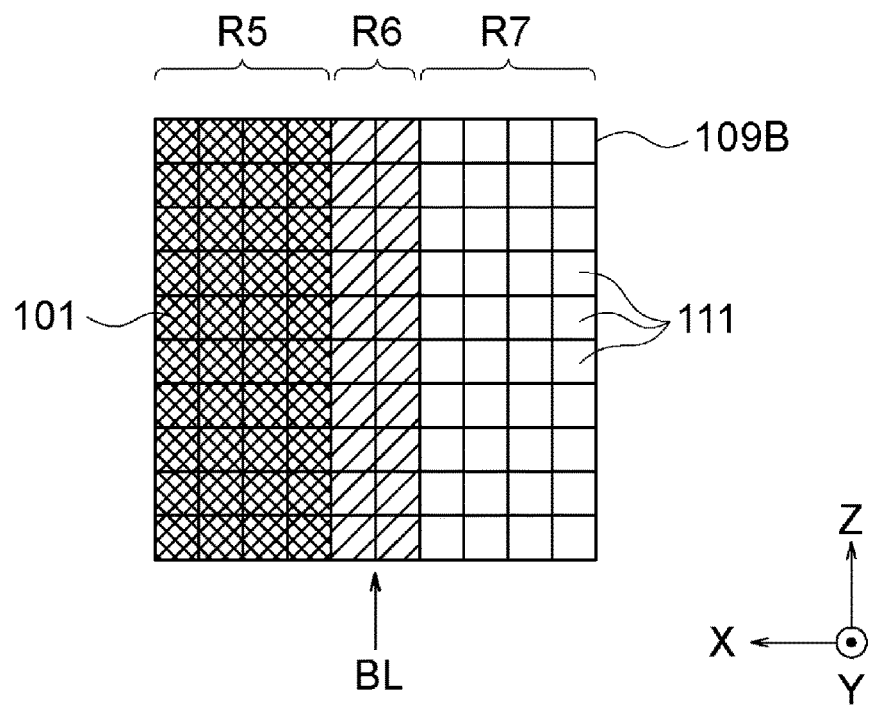

FIG. 7A and FIG. 7B are views for explaining the change of the clarity of the image. These views correspond to the enlarged view of the region VII in FIG. 6. In these views, a plurality of pixels 111 are schematically shown. The hatching attached to the pixel 111 expresses the brightness. The denser the hatching, the lower the brightness in the image.

FIG. 7A shows an example of the image 109 when it is focused (defined as image 109A). In FIG. 7A, a region R1 is a region corresponding to the tool 101. A region R2 is a region corresponding to the region outside of the tool 101. The brightness of the region R1 becomes lower than the brightness of the region R2. When it is focused, for example, the change of the brightness from the region R1 to the region R2 becomes rapid. FIG. 7A expresses a rapid change of brightness by drawing a plurality of pixels 111 as if the plurality of pixels 111 included in the region R1 have the same brightnesses as each other, the plurality of pixels 111 included in the region R2 have the same brightnesses as each other, and the brightnesses of the two are different from each other.

FIG. 7B shows an example of the image 109 when it is not focused (defined as image 109B). In FIG. 7B, a region R5 is a region corresponding to the tool 101. A region R6 is a region including a border BL between the tool 101 and the region on the outside of the tool 101. A region R7 is a region corresponding to the region on the outside of the tool 101. When it is not focused, for example, the change of brightness from the region R5 to the region R7 becomes moderate. FIG. 7B expresses a gentle change of brightness by drawing the plurality of pixels 111 as if the brightness of the pixel 111 included in the region R6 are an intermediate brightness between the brightness of the pixels 111 included in the region R5 and the brightness of the pixels 111 included in the region R7.

When it is not focused, compared with the case when it is focused, the area of the emission side of the light (tool 101 and its periphery) which is incident upon one pixel of the imager 43 becomes broader. As a result, as described above, the change of brightness near the border BL becomes gentle. That is, the clarity near the border BL becomes lower.

In the above explanation, the change of brightness at the border BL between the tool 101 and the region on the outside of that was used as an example. However, at the internal portion of the region corresponding to the tool 101 and/or internal portion of the region on the outside of the tool 101 as well, when it is not focused, in the same way as the above description, the change of the brightness becomes moderate. That is, the clarity falls.

Further, attention was paid to whether the change of brightness was gentle or rapid. However, from another viewpoint, when it is not focused, the maximum value of the brightness in the entire image becomes smaller and/or the minimum value of the brightness in the entire image becomes larger. This may be grasped as one type of fall of the clarity as well.

The brightness, from another viewpoint, is the pixel value (same below). In the explanation of the present embodiment, the term "brightness" and the term "pixel value" may be switched with each other unless contradictions arise.

The number of stages of brightness of an image captured by the camera 37 may be suitably set. For example, the number of stages of brightness may be made 256. At this time, the minimum value of the brightness is 0 and corresponds to black in a gray scale image. Further, the maximum value of brightness is 255 and corresponds to white in the gray scale image. Note that, when a color image is captured (when one upper position pixel includes a plurality of (usually three) lower position pixels for each hue), the brightness explained in the present embodiment may be grasped as an explanation of the brightness in any one type of hue or may be grasped as a value obtained by adding up the brightnesses of two or more (for example, all) hues in the one upper position pixel.

(Index Value of Clarity)

The level of the clarity may be evaluated by a suitable index value based on the brightness. In the following description, three index values will be illustrated. Note that, the explanation of the previously explained index value may be cited for the index values which will be explained after that unless contradictions arise.

(First Index Value)

If the clarity becomes lower, the absolute value of the difference of the brightness between neighboring pixels 111 becomes smaller. Therefore, an index value which becomes larger as the absolute value of the difference becomes larger (sometimes referred to as the "first index value") may be defined. In more detail, for example, differences of brightness from the neighboring pixels 111 are calculated for each of the plurality of pixels 111 in the image 109. Further, for the square value or absolute value of the differences of brightness, a representative value among the plurality of pixels 111 is found, and this is defined as the index value. The larger the value of the index value, the higher the clarity.

The representative value is, for example, the mean value (arithmetical mean), center value, or most frequent value (same below). As the index value, any representative value may be used. For example, the mean value may be used. Note that, when the total number of the pixels 111 which are extracted for calculation of the index value (pixels 111 which evaluated for clarity) described above is constant (for example, when the total number at the reference timing and the total number at the measurement timing are the same), calculation of the total value may be regarded as synonymous with calculation of the mean value.

The plurality of pixels 111 which are evaluated for clarity may be all of the pixels 111 which are included by an image having a broadness corresponding to the broadness of the visual field of the camera 37 (sometimes referred to as the "entire image") or may be only the pixels 111 which are included in a region of part of the entire image (sometimes referred to as a "partial image"). Note that, in the present embodiment, when simply referring to an "image" without particular explanation, either of the entire image and partial image is possible unless contradictions arise.

The above partial image may be suitably set. For example, in the entire image, a region on the outer periphery side (from another viewpoint, a region having a long distance from the tool 101) is sometimes not suitable for evaluation of whether the tool 101 is focused. Therefore, in the entire image, a region of part of the center side (tool 101 and a region having a short distance from the tool 101) may be defined as the partial image. Further, for example, depending on the configuration and imaging conditions of the tool 101, a change of clarity easily appears in the profile of the tool 101. Therefore, a band-shaped region set along the profile so as to include the profile of the tool 101 may be defined as the partial image. The partial image may be one region set at one position in the entire image or may be a plurality of regions which are set at a plurality of positions in the entire image.

In each pixel 111, the neighboring pixel 111 calculated for the difference of brightness may be the pixel 111 in any of the right, left, upper, and lower directions (and oblique direction) as well. Note that, in order, the differences (absolute values) are calculated for the pixels 111, and a representative value of them is defined as the index value. Therefore, whether the direction is right or left basically has no effect upon the index value (right and left are substantially the same). The same is true for whether the direction is upper or lower. Further, in each pixel 111, not only a difference from the neighboring pixel 111 in any one direction, but also the differences from neighboring pixels 111 in two or more directions may be calculated. For example, a difference from the upper side neighboring pixel 111 and a difference from the right side neighboring pixel 111 may be calculated.

For the outermost periphery pixels 111 in the image (entire image or partial image), sometimes it is not possible to calculate a difference in the same way as the other pixels 111. However, the number of such pixels 111 is usually small relative to the total number of the pixels 111 included in the image. Accordingly, the influence of the differences of the outermost peripheral pixels 111 exerted upon the index value (representative value of difference) is small. Therefore, processing of the differences at the pixels 111 at the outermost periphery may be suitably set. For example, when calculating a difference from a right side neighboring pixel 111 and a difference from an upper side neighboring pixel 111, only the difference from the right side neighboring pixel 111 may be calculated for the uppermost side pixel 111 and only the difference from the upper side neighboring pixel 111 may be calculated for the rightmost side pixel 111.

(Second Index Value)

The lower the clarity, the smaller the maximum value Max of the brightness in the image. Further, the minimum value Min of the brightness in the image becomes larger. Therefore, the value computed according to the following formula may be defined as the index value of the clarity (sometimes it will be referred to as the "second index value"). The larger the value of the index value, the higher the clarity.

(Max−Min)/(Max+Min)

Note that, the plurality of pixels 111 to be evaluated (extracted for calculation of the second index value), in the same way as the plurality of pixels 111 to be evaluated in the first index value, may be all of the pixels 111 included in the entire image or may be only the pixels 111 included in one or more partial images. Further, in the calculation of the second index value, the plurality of pixels 111 to be evaluated need not be adjacent to each other either. For example, Max and Min may be calculated for a plurality of pixels 111 which are separated from each other straddling other pixels 111 therebetween.

(Third Index Value)

If the clarity becomes lower, a relatively larger brightness becomes smaller, and a relatively smaller brightness becomes larger. Therefore, an index value of the clarity (sometimes referred to as a "third index value") may be calculated in the following way. First, a representative value (sometimes referred to as the "representative value of the brightness itself") is identified from among the brightnesses of the plurality of pixels 111. Further, an index value where the value becomes larger as the absolute value of the difference between the above representative value and the brightnesses of the plurality of pixels 111 becomes larger may be defined. In more detail, for example, an absolute value or square value of the difference between the representative value of the brightness itself and the brightness of each of the plurality of pixels 111 is found. Further, for the absolute value or square value of this difference, a representative value among the plurality of pixels 111 (sometimes referred to as the "representative value of the difference") may be calculated as the index value.

The representative value, as already explained, is the mean value, center value, or most frequent value. As the representative value of the brightness itself, any value may be used. For example, the center value may be used. Further, as the representative value of difference, any value may be used. For example, the mean value may be used. As already explained, when the total number of the pixels 111 extracted for calculation of the index value is constant, calculation of the total value may be regarded as synonymous with calculation of the mean value.

Note that, the plurality of pixels 111 which are extracted for calculation of the third index value, in the same way as the plurality of pixels 111 extracted for calculation of the first index value, may be all of the pixels 111 included in the entire image or may be only the pixels 111 which are included in one or more partial images. Further, the plurality of pixels 111 which are extracted for calculation of the third index value, in the same way as the plurality of pixels 111 which are extracted for calculation of the second index value, need not be neighboring either.

(Reference Timing and Measurement Timing)

As already explained, in the processing machine 1, for example, the measurement value (position of the tool 101 in the image or detection value of the Y-axis sensor 31Y at the time of focusing) at the reference timing and the measurement values at one or more measurement timings are compared, and the amount of deviation of the position of the tool 101 is identified. Further, the control is corrected based on the amount of deviation. The measurement timing, from another viewpoint, is the timing at which the control is corrected (same below). The reference timing and measurement timing may be suitably set. For example, this is as follows.

The workpiece 103 and the tool 101 are, for example, attached to the processing machine 1 in a positional relationship giving predetermined relative positions at the time when the table 23, saddle 13, and spindle head 17 are positioned at predetermined positions based on the detection values of the sensors 31. After that, predicated on the above positional relationship being maintained, the relative positions of the tool 101 and the workpiece 103 are controlled based on the detection values of the sensors 31, and the workpiece 103 is processed.

Accordingly, for example, after attachment of the workpiece 103 and tool 101 and before the start of processing of the workpiece 103, if the positional relationship of the workpiece 103 and the tool 101 deviates from the above positional relationship (that is if the position of the tool 101 is offset) due to deformation of the processing machine 1 caused by a temperature rise or the like, the relative positions of the shape of the workpiece 103 before processing and the shape formed due to processing deviate from the desired relative positions.

Further, for example, if the positional relationship between the workpiece 103 and the tool 101 deviates from the above positional relationship after the start of processing of the workpiece 103, the relative positions of the shape formed by processing in an initial stage and the shape formed by processing in a later stage deviate from the desired relative positions. That is, the shape of the workpiece 103 deviates from the desired shape. Conversely, in a case of processing where relative positions of the shape of the workpiece before processing and the shape formed due to processing are not problems, the deviation caused before start of the processing may be ignored.

Based on the circumstances as described above, for example, the reference timing may be any timing before the start of processing of the workpiece 103 by the predetermined tool 101. Further, one or more measurement timings may be, for example, any timing during processing of the workpiece 103 by the above tool 101. In this case, the precision of the shape of the workpiece formed due to processing can be improved by correcting the control of the tool 101 based on the amount of deviation after the start of processing.

Further, for example, the reference timing may be a timing that is after attachment of the workpiece 103 and tool 101 and before processing of the workpiece 103 and is envisioned to cause no deviation in the positional relationship between the workpiece 103 and the tool 101. As such a timing, for example, there can be mentioned a timing before operation of the processing machine 1 (from another viewpoint, before the temperature rise). Further, one or more measurement timings, in place of or addition to during processing described above, may include a timing which is before processing of the workpiece 103 by the tool 101 described above and after a warming-up operation of the processing machine 1. In this case, for example, the precision of the relative positions of the shape of the workpiece before processing and the shape of the workpiece formed by processing can be improved.

The measurement timing during processing may be suitably set with respect to various processes for processing the workpiece 103. For example, the tool 101 sometimes repeats movement in a state where it abuts against the workpiece 103 and movement of separation from the workpiece 103 after that. In such a case, the measurement timing may be set with respect to any one or more of the plurality of processes where the tool 101 is separated from the workpiece 103. Further, for example, even in a process in which the state of abutment of the tool 101 against the workpiece 103 is inherently maintained, a process of separating the tool 101 from the workpiece 103 may be inserted at the timing of change of the movement direction of the tool 101, and the measurement timing may be set in this process.

The reference timing and measurement timing may be prescribed by the NC program or may be prescribed by a program different from the NC program so that the measurement is automatically carried out at the time when predetermined measurement conditions are satisfied. Further, the reference timing and measurement timing need not be set in advance in that way either. For example, it is also possible to use a predetermined operation carried out by an operator with respect to a not shown operation part of the processing machine 1 as the trigger to measure the amount of deviation of the position of the tool 101. That is, the timing at which the above predetermined operation is carried out may be defined as the reference timing or measurement timing.

In the aspect as described above where measurement is automatically carried out at the time when predetermined measurement conditions are satisfied, the above measurement conditions may be suitably set. For example, the measurement conditions may include a condition that the processing prescribed by the NC program proceeds and a process where the tool 101 is temporarily separated from the workpiece 103 is reached. In addition to or in place of this, the measurement conditions may include a condition that a temperature detected by a not shown temperature sensor exceeds a predetermined threshold value. Further, for example, any one or more among the plurality of processes prescribed in the NC program being designated and the advancing stage of processing reaching the above designated process may be made measurement conditions.

The reference timing and measurement timing may be set by an operator or may be set by a manufacturer of the processing machine 1. For example, as explained above, a mode where the reference timing and measurement timing are prescribed by the NC program and a mode where the timing at which the predetermined operation is carried out is defined as the reference timing and measurement timing are examples of modes where the reference timing and measurement timing are set by the operator. Further, for example, in a case where measurement is carried out at the time when predetermined measurement conditions are satisfied, the above measurement conditions may be set by the operator or may be set by the manufacturer of the processing machine 1.

(Method of Correction)

The method of correction based on the amount of deviation may be a known method or a method applying a known method. Further, in the control loop explained with reference to FIG. 5, correction may be carried out at any stage. Below, some examples of the method of correction will be shown. In the processing machine 1, the following correction is selectively employed.

The processing machine 1 holds information of a machine coordinate system which is defined in a fixed manner with respect to an immovable portion (for example, base 7) in the processing machine 1. The machine coordinate system, from another viewpoint, is an absolute coordinate system. Further, it is linked with the detection values of the sensors 31. The NC program 107, for example, uses the coordinates of this machine coordinate system to prescribe the operation of the processing machine 1 (for example, the position of the tool 101). Accordingly, the correction part 51*b* in the processing machine 1 may correct the machine coordinate system so as to shift the machine coordinate system by the same amount as the absolute value of the amount of deviation and in the same direction as the deviation. Otherwise, the correction part 51*b* may correct the NC program 107 so as to shift the coordinates of the NC program 107 by the same amount as the absolute value of the amount of deviation and in the direction opposite to the deviation. In other words, the correction part 51*b* may prepare a corrected NC program.

The interpretation part 57 inputs coordinates obtained by interpreting the NC program 107 to the interpolation part 59. At this time, the correction part 51*b* may be present between the two, correct the coordinates from the interpretation part 57 so as to shift the coordinates from the interpretation part 57 by the same amount as the absolute value of the amount of deviation and in the direction opposite to the deviation, and input the result to the interpolation part 59.

The interpolation part 59 calculates the target position for each control cycle based on the input coordinates and inputs the results to the addition part 61. At this time, the correction part 51*b* may be present between the two and correct the target position so as to shift the target position (coordinates) from the interpolation part 59 by the same amount as the absolute value of the amount of deviation and in the direction opposite to the deviation, and input the results to the addition part 61.

The detection positions of the sensors 31 are fed back to the addition part 61. At this time, the correction part 51*b* may be present between the two, correct the detection position so as to shift the detection position (coordinates) from the sensors 31 by the same amount as the absolute value of the amount of deviation and in the same direction as the deviation, and input the results to the addition part 61.

The addition part 61 inputs the error between the target position from the interpolation part 59 and the detection position from the sensor 31 to the position control part 63. At this time, the correction part 51*b* may be present between the addition part 61 and the position control part 63, correct the error so as to shift the error by the same amount as the absolute value of the amount of deviation and in the direction opposite to the deviation, and input the results to the addition part 61.

The correction based on the amount of deviation in the X-direction, the correction based on the amount of deviation in the Y-direction, and the correction based on the amount of deviation in the Z-direction are, for example, realized by the same method of correction among the above explained various methods of correction. However, different methods of correction may be utilized in different directions as well.

(Flow Chart According to Measurement of Amount of Deviation in Imaging Direction)

Figure 8:
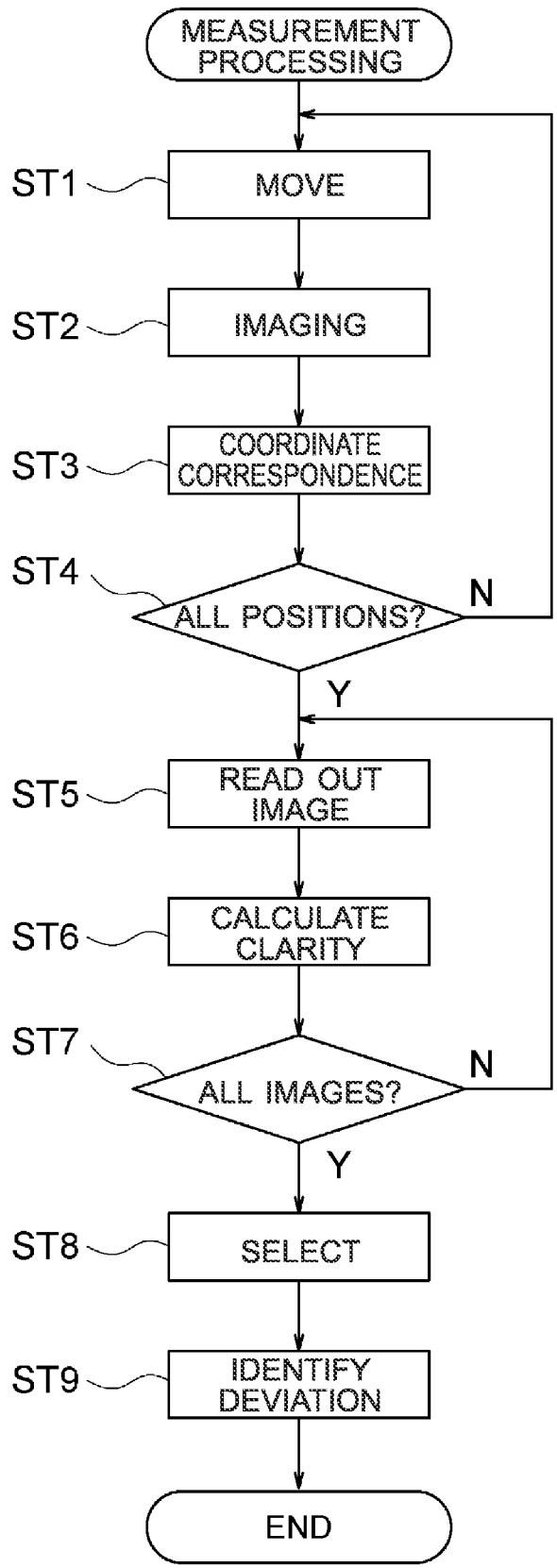
FIG. 8 is a flow chart showing an example of a routine of processing run by a control unit in the processing machine in FIG. 1.

FIG. 8 is a flow chart showing an example of a routine of processing executed by the control unit 5 for realizing the measurement method of the amount of deviation in the imaging direction explained above. This processing is, for example, carried out at the measurement timing.

Before step ST1, the control unit 5 (measurement part 51*a*) makes the tool 101 and the camera 37 relatively move so that the tool 101 is positioned within the visual field of the camera 37. Specifically, in the present embodiment, the control unit 5 controls the various drive sources 29 so that the front end of the tool 101 is positioned between the camera 37 and the illumination device 39.

At step ST1, the control unit 5 (measurement part 51*a*) makes the tool 101 and the camera 37 relatively move in the Y-direction. In more detail, in the present embodiment, the control unit 5 moves the saddle 13 in the Y-direction by the Y-axis drive source 29Y. This movement is movement from one imaging position to the next imaging position. The movement amount is, for example, the pitch of the plurality of imaging positions (already explained). The position control (control of movement amount) at this time is, for example, full closed loop control in which the detection value of the Y-axis sensor 31Y is fed back. However, the position control may be made semi-closed loop control or open control as well.

At step ST2, the control unit 5 (measurement part 51*a*) acquires an image of the tool 101 by the camera 37.

At step ST3, the control unit 5 (measurement part 51*a*) stores the detection position (coordinates) of the Y-axis sensor 31Y at the present and the acquired image linked together.

At step ST4, the control unit 5 (measurement part 51*a*) judges whether imaging at all of the plurality of imaging positions which are planned ends. In a case of negative judgment, the control unit 5 returns to step ST1 and continues the imaging. In a case of positive judgment, the control unit proceeds to step ST5.

At step ST5, the control unit 5 (Y-axis deviation calculation part 55Y) reads out one image from among the plurality of images which are accumulated by repetition of steps ST1 to ST4.

At step ST6, the control unit 5 (Y-axis deviation calculation part 55Y) calculates the clarity (index value) at the read out image.

At step ST7, the control unit 5 (Y-axis deviation calculation part 55Y) judges whether calculation of the clarity has ended for all of the plurality of images accumulated by repetition of steps ST1 to ST4. In a case of negative judgment, the control unit 5 returns to step ST5 and continues the calculation of the clarity. In a case of positive judgment, the control unit proceeds to step ST8.

At step ST8, the control unit 5 (Y-axis deviation calculation part 55Y) compares the clarities of the plurality of images obtained by repetition of step ST7. Further, the control unit 5 selects the image having the highest clarity and identifies the position in the Y-direction which was linked with the selected image at step ST3. That is, the position in the Y-direction at the time of focus at this measurement timing is identified. Note that, as already explained, in place of such processing, the position at which the clarity peaks may be identified from a function approximating the correlation between the positions when a plurality of images are acquired and the clarities of the plurality of images.

At step ST8, the control unit 5 (Y-axis deviation calculation part 55Y) identifies the amount of deviation by comparing the position in the Y-direction at the time of focus which is identified at step ST8 and the position at the time of focus which is acquired in advance. The position at the time of focus which is acquired in advance is, for example, the position obtained by performing the same processing as steps ST1 to ST8 at the reference timing. Note that, the position at the time of focus which is acquired in advance may be made a value which is input to the processing machine 1 by the manufacturer or operator as well.

The above procedure is in the end just one example and may be suitably changed. For example, this may be changed in the following way. In the example shown, after repetition of imaging (steps ST1 to ST4), repetition of calculation of clarity (steps ST5 to ST7) is carried out. However, one series of processing performing one instance of imaging and calculation of the clarity of the image obtained by that imaging may be repeated as well. Further, the repetition of imaging and the repetition of calculation of the clarity may be carried out alongside each other by multi-tasking with a time difference to a certain extent. In the example shown, after calculating the clarity for all images, the image having the highest clarity is selected. However, whenever the clarity is calculated, it may be judged whether the image having the highest clarity must be updated, and updating may performed at the time of positive judgment. Due to this, the image having the highest clarity may also be selected.

As already explained, any of the plurality of images obtained by repetition of step ST2 (for example, the image selected at step ST8) may be used for identification of the positions of the tool 101 in the X-direction and Z-direction. However, the image used for identification of positions in the X-direction and Z-direction may be an image obtained by processing different from step ST2 as well.

Note that, in the processing machine 1, the configuration directly relating to measurement of the position of the tool 101 by imaging may be grasped as a measuring device 2 (notation is shown in FIG. 1). For example, the measuring device 2 may include the imaging part 33 and image processing device 47.

As described above, in the present embodiment, the processing machine 1 has the first drive source (Y-axis drive source 29Y), camera 37, image processing device 47, and control device 45. The Y-axis drive source 29Y makes the workpiece 103 and the tool 101 relatively move in the first direction (Y-direction). The camera 37 captures the tool 101 in the Y-direction to acquire an image. The image processing device 47 identifies the position (in more detail, amount of deviation) in the Y-direction of the tool 101 based on the clarity of the tool 101 in the image. The control device 45 controls the Y-axis drive source 29Y based on the position (amount of deviation) in the Y-direction of the tool 101 identified by the image processing device 47.

From another viewpoint, in the present embodiment, the measuring device 2 measures the position of the tool 101 which moves relative to the workpiece 103 in the first direction (Y-direction). The measuring device 2 has the camera 37 and image processing device 47. The camera 37 captures the tool 101 in the Y-direction to acquire an image. The image processing device 47 identifies the position in the Y-direction of the tool 101 based on the clarity of the tool 101 in the image.

From still another viewpoint, in the present embodiment, the manufacturing method of the processed object (workpiece 103 after processing) has a step of using the processing machine 1 according to the embodiment as described above to bring the workpiece 103 and the tool 101 into contact and process the workpiece 103 into the processed object.

Accordingly, for example, the position of the tool 101 can be identified in the imaging direction where it was impossible to identify the position of the tool 101 in the past (Y-direction in the present embodiment). As a result, for example, the following effects are exhibited.

Conventionally, the position of the tool 101 was measured based on the position of the tool 101 in the image. Accordingly, in order to identify the position in the Y-direction, the camera 37 had to be arranged so as to perform imaging from a direction other than the Y-direction (for example, X-direction). However, according to the present embodiment, the camera 37 can be arranged so as to perform imaging in the Y-direction. As a result, for example, the degree of freedom of arrangement of the camera 37 is improved.

Further, conventionally, in order to identify the positions of the tool 101 in three directions (X-, Y-, and Z-directions), two cameras 37 performing imaging from two different directions (for example, X- and Y-directions) were necessary. However, according to the present embodiment, the positions in the three directions can be identified by one camera. As a result, the necessity of arrangement of two or more cameras 37 is reduced.

Due to the decrease in the number of the cameras 37, for example, the cost of the processing machine 1 is reduced. Specifically, for example, by reduction of one imaging part 33, a cost reduction of 1,000,000 yen to 2,000,000 yen can be expected. Further, due to the decrease in the number of the imaging parts 33, for example, the member in which the imaging part 33 is arranged (table 23 in the present embodiment) is reduced in size. Otherwise, it becomes possible to effectively utilize the space on the member described above (table 23).

The processing machine 1 may further have a second drive source (X-axis drive source 29X), and third drive source (Z-axis drive source 29Z). The X-axis drive source 29X may move the workpiece 103 and the tool 101 relative to each other in the second direction (X-direction) perpendicular to the first direction (Y-direction). The Z-axis drive source 29Z may move the workpiece 103 and the tool 101 relative to each other in the third direction (Z-direction) which is perpendicular to both of the Y-direction and the X-direction. The image processing device 47 may identify the positions of the tool 101 in the X-direction and Z-direction based on the position of the tool 101 in the image acquired by the camera 37. The control device 45 may control the X-axis drive source 29X based on the position of the tool 101 in the X-direction identified by the image processing device 47. Further, the control device 45 may control the Z-axis drive source 29Z based on the position of the tool 101 in the Z-direction identified by the image processing device 47.

In this case, as already explained, the positions in three directions can be identified by one camera 37. As a result, reduction of the number of the cameras 37 is facilitated.

The processing machine 1 may further have a first sensor (Y-axis sensor 31Y) which detects the relative positions of the workpiece 103 and the tool 101 in the first direction (Y-direction). The control device 45 may perform feedback control of the first drive source (Y-axis drive source 29Y) based on the detection value of the Y-axis sensor 31Y (FIG. 5). The camera 37 may be arranged at a position (table 23 in the present embodiment) at which it relatively moves in the Y-direction relative to the tool 101 along with the relative movements of the workpiece 103 and the tool 101 in the Y-direction and may acquire a plurality of images having different relative positions in the Y-direction relative to the tool 101 (steps ST1 to ST4). The image processing device 47 may identify a first relative position of the workpiece 103 and the tool 101 in the Y-direction (step ST8) at which the clarity of the tool 101 becomes the highest (such an image can be acquired) based on the plurality of images and the relative positions of the workpiece 103 and the tool 101 in the Y-direction which are detected by the Y-axis sensor 31Y at the time of acquisition of the plurality of images. Further, the image processing device 47 may identify a first amount of deviation between the identified first relative position and a relative position of the workpiece 103 and the tool 101 in the Y-direction at the time when the camera 37 is focused on the tool 101 (time when the clarity is the highest) which are acquired in advance (step ST9). The control device 45, based on the first amount of deviation, may correct the feedback control of the Y-axis drive source 29Y based on the detection value of the Y-axis sensor 31Y.

In this case, for example, the position (amount of deviation) of the tool 101 can be identified by just acquiring the detection value of the Y-axis sensor 31Y at the time when the clarity is the highest. That is, measurement of the position (in more detail, amount of deviation) of the tool 101 based on the clarity is facilitated. For example, the troublesome work of identifying the correlation between the change of clarity and the relative positions of the tool 101 and the camera 37 is unnecessary. Further, for example, nominally (when the depth of field is not considered), the precision of measurement of the position of the tool 101 can be made equal to the positioning precision of the Y-axis drive source 29Y. That is, the position of the tool 101 can be measured with a sufficient precision. The Y-axis drive source 29Y utilized for imaging is utilized for processing. Also, the Y-axis sensor 31Y for identifying the position of the tool 101 based on the imaging is utilized for processing. Accordingly, it is not necessary to provide the drive source and sensor for only imaging.

The processing machine 1 may further have a second sensor (X-axis sensor 31X) and third sensor (Z-axis sensor 31Z). The X-axis sensor 31X may detect the relative positions of the workpiece 103 and the tool 101 in the second direction (X-direction). The Z-axis sensor 31Z may detect the relative positions of the workpiece 103 and the tool 101 in the third direction (Z-direction). The control device 45 may perform feedback control of the second drive source (X-axis drive source 29X) based on the detection value of the X-axis sensor 31X. Further, the control device 45 may perform feedback control of the third drive source (Z-axis drive source 29Z) based on the detection value of the Z-axis sensor 31Z. The image processing device 47 may identify the second amount of deviation (amount of deviation dX in FIG. 6) between the position in the X-direction of the tool 101 at the reference timing and the position in the X-direction of the tool 101 at the measurement timing based on the position in the X-direction of the tool 101 in the image which is acquired at the first timing (reference timing) and the position in the X-direction of the tool 101 in the image acquired at the second timing (measurement timing) after that. In the same way, the image processing device 47 may identify the third amount of deviation (amount of deviation dZ in FIG. 6) between the position in the Z-direction of the tool 101 at the reference timing and the position in the Z-direction of the tool 101 at the measurement timing based on the position in the Z-direction of the tool 101 in the image which is acquired at the third timing (reference timing) and the position in the Z-direction of the tool 101 in the image acquired at the fourth timing (measurement timing) after that. The control device 45 may correct the feedback control of the second drive source (X-axis drive source 29X) based on the detection value of the second sensor (X-axis sensor 31X) based on the amount of deviation dX. In the same way, the control device 45 may correct the feedback control of the third drive source (Z-axis drive source 29Z) based on the detection value of the third sensor (Z-axis sensor 31Z) based on the amount of deviation dZ.

In this case, for example, in the Y-direction, the amount of deviation of the tool 101 is identified based on the clarity, and the amount of deviation of the tool 101 is identified based on the positions of the tool 101 in the image in the X-direction and Z-direction. That is, the amount of deviation of the tool 101 is suitably identified for each direction using different measurement methods. On the other hand, the control is corrected based on the amount of deviation in all directions. As a result, the processing precision can be improved by an overall simple control system.

The image processing device 47 may calculate the difference of brightness from the neighboring pixel 111 for each of the plurality of pixels 111 in the image and may calculate an index value (first index value) that becomes larger as the absolute value of the above difference among the plurality of pixels 111 becomes larger. Further, the image processing device 47 may identify the position (amount of deviation) of the tool 101 in the first direction (Y-direction) by using the first index value as an index value which becomes larger in value as the clarity becomes higher.

In experiments by the present inventors, compared with the second index value and third index value, the first index value is larger in change with respect to a change of the relative positions of the tool 101 and the workpiece 103 in the Y-direction. Accordingly, for example, by using the first index value, the detection precision of the position of the tool 101 in the Y-direction is improved.

In more detail, the image processing device 47 may calculate the value obtained by adding the square values of the difference of the brightnesses of the pixels 111 which are neighboring to each other for all of the pixels in the image (entire image or one or more partial images as already explained) as the index value (first index value).

In this case, for example, compared with a mode where the absolute value of difference is added (this mode may be included in the technique according to the present disclosure), in the same way as dispersion in statistics, the difference of brightness can be more suitably evaluated. As a result, the precision of measurement of the tool 101 is improved.

Use may be also made of the second index value which is different from the first index value. Specifically, the image processing device 47 may identify the maximum value and minimum value of the brightness from among the plurality of pixels in the image and may calculate an index value (second index value) obtained by dividing the difference between the maximum value and the minimum value by the sum of the maximum value and the minimum value. Further, the image processing device 47 may identify the position (amount of deviation) of the tool 101 in the first direction (Y-direction) by using the second index value as the index value which becomes larger as the clarity becomes higher.

In this case, for example, compared with a mode where the first index value is used, the load of processing is smaller. Accordingly, for example, it is facilitated to realize a mode where calculation of the index value (step ST6) is carried out in between the repetitions of movement and imaging (steps ST1 to ST4).

A third index value which is different from the first and second index values may be used as well. Specifically, the image processing device 47 may identify a representative value of brightness (for example, center value) from among the plurality of pixels 111 in the image, may calculate the difference from the representative value for each of the plurality of pixels 111 in the image, and may calculate an index value (third index value) which becomes larger as the absolute value of the differences among the plurality of pixels 111 becomes larger. Further, the image processing device 47 may use the third index value as an index value which becomes larger as the clarity becomes higher to identify a position (amount of deviation) of the tool 101 in the first direction (Y-direction).

In this case, for example, the load of processing is smaller compared with a mode where the first index value is used. Further, compared with a mode where the second index value is used, the brightnesses of the plurality of pixels 111 in the image are apt to be reflected in the index value, therefore the precision of evaluation of the clarity is improved.

(Variations)

Below, variations of the embodiment will be explained. In the following explanation, basically, only the differences from the embodiment will be explained. The matters which are not particularly explained may be considered the same as the embodiment or may be deduced from the embodiment. In the following explanation, configurations corresponding to configurations in the embodiment, for convenience, will sometimes be assigned the notations of the embodiment even if there are differences from the embodiment.

(Utilization of Touch Sensor)

The processing machine 1 may have a touch sensor as well. The touch sensor may be utilized for a suitable purpose. For example, the touch sensor may be utilized for identification of the correspondence between the relative positions of the workpiece 103 and the tool 101 and the detection positions of the sensors 31 (from another viewpoint, the machine coordinate system of the processing machine 1). Further, for example, the touch sensor may be utilized for identification of the shape of the workpiece 103. The configuration of the touch sensor and the operation of the processing machine 1 when utilizing the touch sensor may be known ones or ones applying known ones. Below, examples of the configuration of the touch sensor and operation of the processing machine 1 will be shown.

Figure 9A:
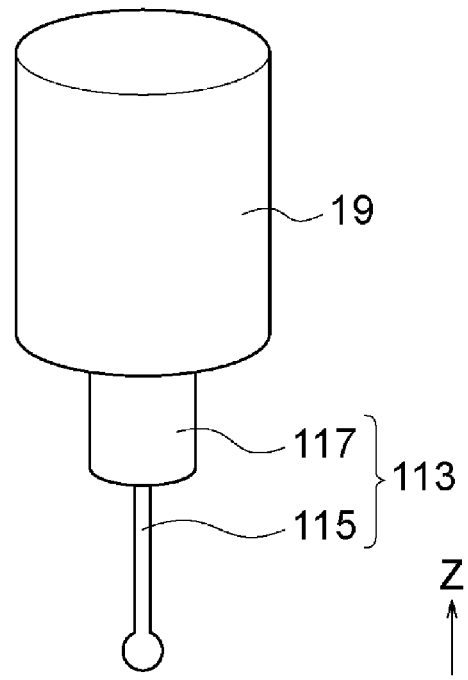
FIG. 9A and FIG. 9B are perspective views showing a touch sensor in first and second modes of attachment.
Figure 9B:
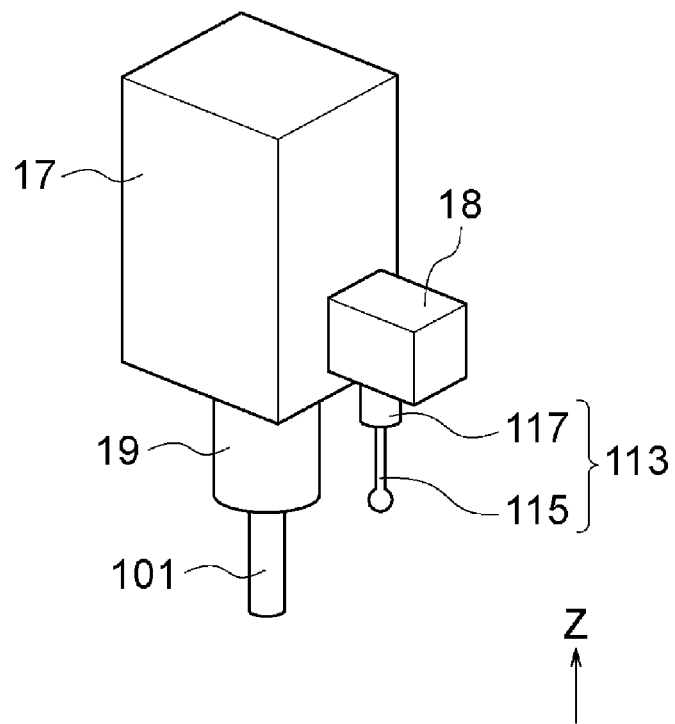

FIG. 9A is a perspective view showing a touch sensor 113 in a first mode of attachment. FIG. 9B is a perspective view showing a touch sensor 113 in a second mode of attachment.

The touch sensor 113, for example, has a stylus 115 which contacts the workpiece 103 and a sensor body 117 holding the stylus 115. The stylus 115, for example, has schematically rod-state shape. The front end thereof may be given a diameter larger than the other portions by formation in a ball shape. The sensor body 117, for example, outputs a touch signal to the control unit 5 when the stylus 115 comes into contact with the workpiece 103.

The principle of detection by contact by the touch sensor 113 may be a suitable one. As the principle of detection, for example, there can be mentioned the principle of the stylus 115 moving relative to the sensor body 117 due to a force received from the workpiece 103 and consequently a movable contact and a fixed contact coming into contact. Further, for example, there can be mentioned the principle of the movement of the stylus 115 as described above being detected by an optical sensor. Further, for example, there can be mentioned the principle of the force received by the stylus 115 from the workpiece 103 being detected by a pressure sensor. Further, for example, there can be mentioned the principle of a closed circuit including the workpiece 103 and stylus 115 being configured by contact of the stylus 115 with a workpiece 103 having conductivity.

In the mode of attachment shown in FIG. 9A, the touch sensor 113 is held by the spindle 19 in place of the tool 101. In the mode of attachment shown in FIG. 9B, the touch sensor 113 is fixed with respect to the member (spindle head 17 in the present embodiment) which movably holds the spindle 19 at a position separated from the spindle 19. In the mode in FIG. 9B, the sensor holding part 18 holding the touch sensor 113, for example, may hold the touch sensor 113 so as to be immovable relative to the spindle head 17. However, the sensor holding part 18 may hold the touch sensor 113 so as to be movable between a position at the time when the touch sensor 113 is not used and a position at the time when the touch sensor 113 is used (for example, the position closer to the −Z side than the former position) as well.

In both of FIG. 9A and FIG. 9B, the touch sensor 113 is able to move together with the spindle 19. Accordingly, in the same way as the tool 101, the touch sensor 113 is able to relatively move relative to the workpiece 103 and is able to relatively move relative to the camera 37 along with this relative movement. Further, the relative movements are detected by the sensors 31.

From another viewpoint, in both of FIG. 9A and FIG. 9B, the touch sensor 113 is arranged at a position having a certain positional relationship with respect to the position at which the tool 101 is arranged. In FIG. 9A, the certain positional relationship is a relationship where the two positions become the same position. In FIG. 9B, the certain positional relationship is a relationship where the two positions are separated with a predetermined distance in a predetermined direction.

The processing machine 1 (control device 45), for example, controls the drive sources 29 of the three axes so as to make the touch sensor 113 and the workpiece 103 relatively move in at least one direction among the three directions (X-, Y-, and Z-directions). Further, when contact with the workpiece 103 is detected by the touch sensor 113, the processing machine 1 stops the relative movements and acquires the detection value of the sensor 31 in at least one direction described above at that time.

According to the above operation, for example, in at least one direction described above, the correspondence between the relative positions of the workpiece 103 and the touch sensor 113 and the detection value of the sensor 31 in at least one direction described above (from another viewpoint, the coordinates of the machine coordinate system) is identified. Further, for example, by performing the above operation in the other directions as well, the correspondence is identified in all directions. Further, for example, by performing the above operation in various directions and at various positions, the shape of the workpiece 103 is identified.

Here, as already explained, the touch sensor 113 and the tool 101 have a certain positional relationship. Accordingly, as described above, if the correspondence between the relative positions of the workpiece 103 and the touch sensor 113 and the machine coordinate system is identified, substantially, the correspondence between the relative positions of the workpiece 103 and the tool 101 and the machine coordinate system is identified. The positional relationship between the touch sensor 113 and the tool 101 may be stored in the processing machine 1 by the manufacturer of the processing machine 1 or may be stored in the processing machine 1 by the operator.

The information of the correspondence between the relative positions of the workpiece 103 and the tool 101 and the machine coordinate system (detection values of the sensors 31) may be, for example, utilized for reduction of deviation in the following way.

In the processing machine 1 according to the embodiment, for example, it is supposed that the workpiece 103 is fixed at a predetermined position with respect to the table 23. Further, in the NC program, under that supposition, the operation for forming a desired shape in the workpiece 103 is prescribed by the coordinates in the machine coordinate system. Accordingly, for example, if the position of the workpiece 103 with respect to the table 23 deviates from the above predetermined position, the position of the shape formed by processing deviates from the position of the shape of the workpiece 103 before processing. The position of the workpiece 103 with respect to the table 23 was explained above, but the same is true for the position of the tool 101 with respect to the spindle 19.

Therefore, before processing or during processing, the processing machine 1 (control device 45) measures the correspondence between the relative positions of the workpiece 103 and the touch sensor 113 (from another viewpoint, tool 101) and the machine coordinate system. The correspondence may be made, for example, the detection positions by the sensors 31 at the time when the touch sensor 113 contacts the workpiece 103. On the other hand, the processing machine 1 (control device 45), for example, holds in advance the information of the supposed correspondence between the relative positions of the workpiece 103 and the touch sensor 113 (tool 101) and the machine coordinate system. Further, by comparing the measured correspondence and the supposed correspondence, the amount of deviation of the two (below, sometimes referred to as the "amount of deviation identified by the touch sensor 113") is identified. The above amount of deviation, in more detail, includes the amount of deviation of the workpiece 103 and the amount of deviation of the tool 101.

The processing machine 1 corrects the control performed by the main control part 49 based on the amount of deviation identified by the above touch sensor 113 (from another viewpoint, the measured correspondence). The method of correction thereof may be made substantially the same as the method of correction based on the amount of deviation identified according to the imaging as already explained. For example, the correction may be made the correction of the machine coordinate system, correction of the NC program 107, correction of the coordinates from the interpretation part 57, correction of the target position from the interpolation part 59, correction of the detection positions from the sensors 31, or correction of the error from the addition part 61. The explanation of the method of correction based on the amount of deviation identified according to the imaging may be cited for the method of correction based on the amount of deviation identified by the touch sensor 113.

(Joint Use of Touch Sensor and Camera)

The above explanation was predicated on the correspondence between the tool 101 and the touch sensor 113 being invariable. However, if the processing machine 1 is deformed due to a temperature change etc. and the position of the tool 101 deviates, the positional relationship between the tool 101 and the touch sensor 113 deviates from the supposed positional relationship. As a result, the measurement values of the correspondence between the positional relationship of the workpiece 103 and the tool 101 and the machine coordinate system (from another viewpoint, the amount of deviation between the measured correspondence and the supposed correspondence) become ones including error. In turn, the precision of correction based on the amount of deviation identified by the touch sensor 113 explained above falls.

Therefore, the amount of deviation identified by the touch sensor 113 (from another viewpoint, the measurement values of the correspondence between the positional relationship of the workpiece 103 and the tool 101 and the machine coordinate system) may be corrected based on the amount of deviation of the tool 101 identified by the imaging. The specific method thereof may be a suitable one.

For example, the correction based on the amount of deviation which is identified by the imaging explained in the explanation of the embodiment and the correction based on the amount of deviation identified by the touch sensor 113 described above may be simply combined. In other words, the corrections may be used together as explained above (without alteration). The deviation of the positional relationship of the tool 101 and the touch sensor 113 from the supposed positional relationship includes deviation of the position of the tool 101. Accordingly, if the two corrections are used together as described above, substantially, in a state where the positional relationship between the tool 101 and the touch sensor 113 (from another viewpoint, the measurement values of the correspondence between the positional relationship of the workpiece 103 and the tool 101 and the machine coordinate system) is corrected according to the correction based on the amount of deviation identified by imaging, correction based on the amount of deviation identified by the touch sensor 113 (from another viewpoint, measurement values of the correspondence) is carried out. Note that, in such a mode, the correction based on the amount of deviation identified by the imaging and the correction based on the amount of deviation identified by the touch sensor 113 may be the same as each other or may be different from each other on at which stage the correction is carried out (correction of the machine coordinate system, correction of the NC program 107, and correction of the coordinates from the interpretation part 57, etc.)

Further, for example, it is possible to not perform correction based on the amount of deviation identified by the imaging as explained in the embodiment and to perform only correction based on the amount of deviation identified by the touch sensor 113. In this case, the amount of deviation of the positional relationship of the workpiece 103 and the tool 101 which was measured by the touch sensor 113 from the supposed positional relationship is corrected by the amount of deviation of the tool 101 obtained by imaging. Specifically, the two may be added and used for correction. This is substantially the same as the case where two corrections are determined as corrections in the same stage in the mode where two corrections are used together as explained above. Further, this method of correction, finally, in the same way as the embodiment, may be correction being carried out based on the amount of deviation identified by the imaging.

Note that, as will be understood from the above explanation, when referring to the measurement values of the correspondence between the positional relationship of the workpiece 103 and the tool 101 and the machine coordinate system (from another viewpoint, the detection positions of the sensors 31) being corrected, it designates not only the processing for correcting the measurement values of the correspondence in actuality, but also processing equivalent to this.

(Imaging of Touch Sensor)

In the above explanation, only the case where the position of the tool 101 was deviated was referred to. However, sometimes the position is deviated also for the touch sensor 113, in the same way as the tool 101. In this case, in the same way as the case where the position of the tool 101 deviates, the premise that the positional relationship between the tool 101 and the touch sensor 113 is invariable breaks down. In turn, the precision of correction based on the amount of deviation identified by the touch sensor 113 falls.

Therefore, in the same way as the tool 101, the amount of deviation of the position of the touch sensor 113 may be identified by the imaging. Further, in addition to (or in place of) combining correction based on the amount of deviation of the tool 101 identified by the imaging with correction based on the amount of deviation identified by the touch sensor 113, correction based on the amount of deviation of the touch sensor 113 identified by the imaging may be combined.

The measurement of the amount of deviation of the position of the touch sensor 113 by imaging may be considered basically the same as the measurement of the amount of deviation of the position of the tool 101 by imaging. Accordingly, the explanation according to the measurement of the amount of deviation of the position of the tool 101 in the embodiment may be cited for the measurement of the amount of deviation of the touch sensor 113 by replacing the term "tool 101" by the term "touch sensor 113" unless contradictions arise.

Further, the method of combining correction based on the amount of deviation of the touch sensor 113 identified by imaging with correction based on the amount of deviation identified by the touch sensor 113 may be considered the same as the method of combining correction based on the amount of deviation of the tool 101 identified by imaging with correction based on the amount of deviation identified by the touch sensor 113 (already explained).

As described above, the processing machine 1 may further have a touch sensor 113. The touch sensor 113 may be arranged at a position (spindle 19 or touch sensor holding part 18) that has a certain positional relationship with respect to the position at which the tool 101 is arranged (spindle 19 in the present embodiment). By arrangement at the position having certain positional relationship described above, the touch sensor 113 is made to relatively move in the first direction (Y-direction) relative to the workpiece 103 by the first drive source (Y-axis drive source 29Y), is made to relatively move in the Y-direction relative to the camera 37 along with these relative movements, and is detected with respect to the relative movement in the Y-direction relative to the workpiece 103 by the first sensor (Y-axis sensor 31Y). The camera 37 may capture the touch sensor 113 in the Y-direction and acquire a plurality of second images in which the relative positions in Y-direction between the camera 37 and the touch sensor 113 are different from each other. Based on the plurality of second images and the second relative positions in the Y-direction between the workpiece 103 and the touch sensor 113 which are detected by the Y-axis sensor 31Y at the time when the plurality of second images are acquired, the image processing device 47 may identify the second relative position in the Y-direction between the workpiece 103 and the touch sensor 113 where the clarity of the touch sensor 113 becomes the highest (such a second image can be acquired). Further, the image processing device 47 may identify a fourth amount of deviation between the identified second relative position and the detection value of the Y-axis sensor 31Y at the time when the camera 37 is focused on the touch sensor 113 which is acquired in advance. Based on the detection value of the Y-axis sensor 31Y at the time when abutment of the touch sensor 113 against the workpiece 103 is detected by the touch sensor 113, the control device 45 may identify the correspondence between the relative positions of the workpiece 103 and the tool 101 and the detection value of the Y-axis sensor 31Y. Further, the control device 45 may correct the information of the above correspondence based on the above fourth amount of deviation and perform feedback control of the first drive source (Y-axis drive source 29Y) based on the information of the corrected correspondence and the detection value of the Y-axis sensor 31Y.

In this case, for example, the control is corrected based on the amount of deviation identified by the touch sensor 113, the amount of deviation of the tool 101 identified by imaging, and the amount of deviation identified by the touch sensor 113 which is identified by the imaging. As a result, the processing precision is improved.

A processing machine 1 according to a variation which captures the touch sensor 113 may be conceived of without being predicated on the imaging of the tool 101. In this case, the processing machine 1 has the first drive source (Y-axis drive source 29Y), touch sensor 113, camera 37, image processing device 47, and control device 45. The Y-axis drive source 29Y makes the workpiece 103 and the tool 101 relatively move in the first direction (Y-direction). The touch sensor 113 is arranged at a position having the certain positional relationship with respect to the position at which the tool 101 is arranged. The camera 37 captures the touch sensor 113 in the Y-direction to acquire an image. The image processing device identifies the position in the Y-direction of the touch sensor 113 based on the clarity of the touch sensor 113 in the image. The control device 45 controls the Y-axis drive source 29Y based on the position in the Y-direction of the touch sensor 113 identified by the image processing device 47.

In this case, for example, in the same way as imaging of the tool 101, the position of the touch sensor 113 can be identified in the imaging direction (Y-direction) in which the position could not be identified up to now. As a result, the degree of freedom concerning the imaging direction is improved. In turn, the degree of freedom for design of the processing machine 1 is improved.

(Another Example of Configuration of Guide)

FIG. 10 is a view showing an example of the configuration different from the example of the configuration explained with reference to FIG. 2B concerning the guide which guides the table 23, saddle 13, or spindle head 17. This view becomes a cross-sectional view corresponding to FIG. 2B. For convenience of explanation, the table 23 will be taken as an example as the member guided by the guide.

A guide 25A shown in FIG. 10 is configured by a so-called static pressure guide. Specifically, a gap is formed between the guided surface of the table 23 and the guide surface of the bed 21. A fluid is supplied into the gap with a predetermined pressure by a pump 75 etc. The fluid may be a gas (for example, air) or may be a liquid (for example, oil).

When the guide 25A is configured by a static pressure guide in this way, for example, the friction resistance at the time when the table 23 is moved in its movement direction according to the NC program 107 is small, therefore positioning in the movement direction can be carried out with a high precision. According to such a configuration, a high processing precision can be realized. As a result, the usefulness of correction based on the amount of deviation identified by imaging becomes high.

(Another Example of Drive Mechanism)

FIG. 10 described above is also a view showing an example of a configuration other than a linear motor as the configuration of the drive mechanism. Specifically, in FIG. 10, a screw shaft 77 and a nut 79 screwed with the screw shaft 77 are shown. That is, a screw mechanism (for example, ball screw mechanism or sliding screw mechanism) is shown. In a state where one of the screw shaft 77 and the nut 79 (nut 79 in the example shown) is restricted in rotation, the other of the screw shaft 77 and the nut 79 (screw shaft 77 in the example shown) is rotated. Thereby the two members relatively move in the axial direction. One of the screw shaft 77 and the nut 79 (screw shaft 77 in the example shown) is supported upon the bed 21, and the other of the screw shaft 77 and the nut 79 (nut 79 in the example shown) is supported on the table 23. The driving force of rotating the screw shaft 77 (or nut 79) is, for example, generated by a rotary electric motor (not shown).

(Example of Configuration of Bearing of Main Shaft)

Figure 11:
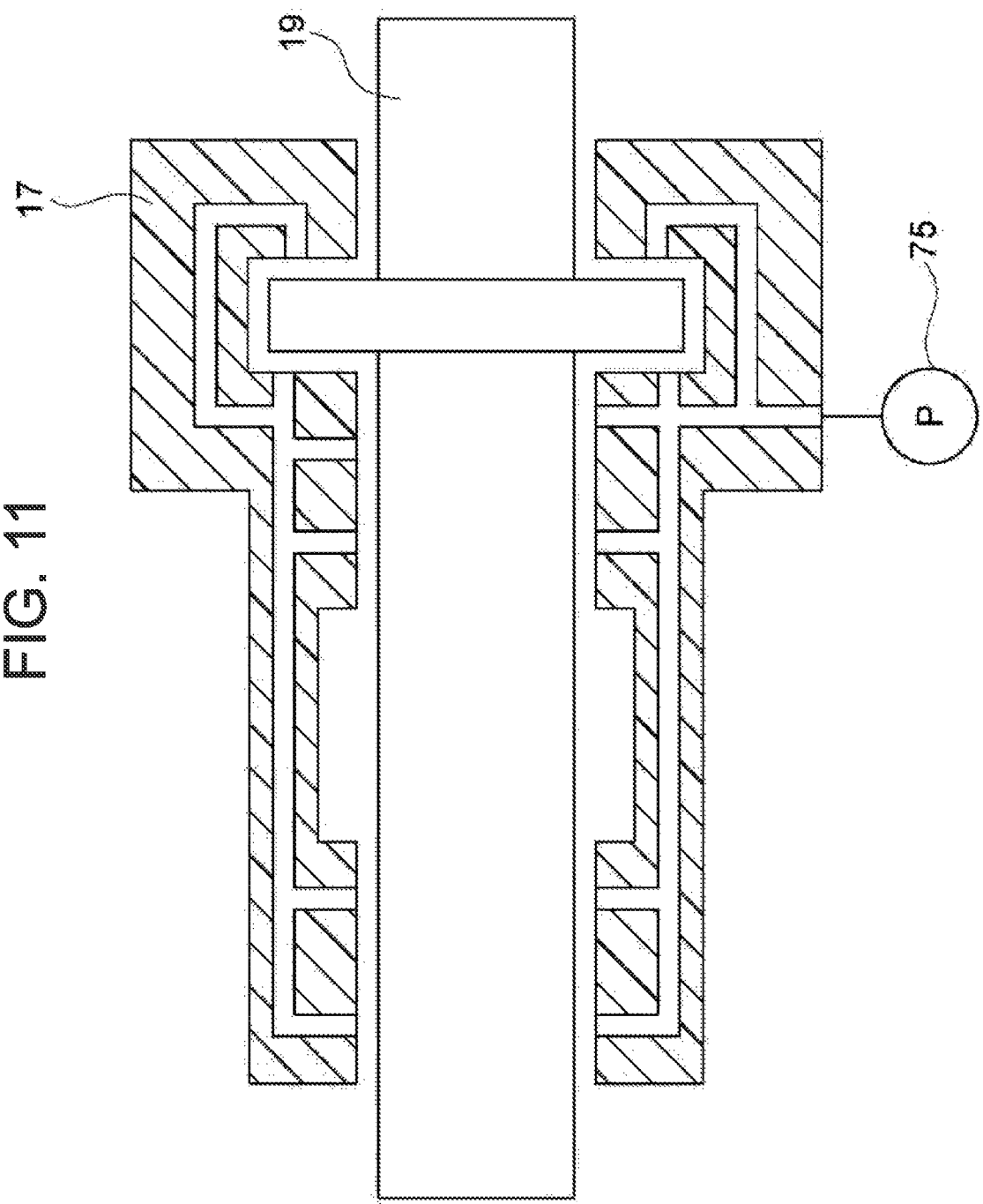
FIG. 11 is a cross-sectional view showing an example of the configuration of a bearing of a main shaft in the processing machine in FIG. 1.

FIG. 11 is a cross-sectional view showing an example of the configuration of the bearing of the spindle 19.

As explained in the explanation of the embodiment, the bearing of the spindle 19 may be made a sliding bearing, rolling bearing, static pressure bearing, or combination of two or more among them. In FIG. 11, a static pressure bearing is illustrated. Specifically, a gap is configured between the outer peripheral surface of the spindle 19 and the inner peripheral surface of the spindle head 17. To the gap, the fluid is supplied with a predetermined pressure by a pump 75 etc. The fluid may be a gas (for example, air) or may be a liquid (for example, oil).

When the spindle 19 is supported by a static pressure bearing in this way, for example, the friction resistance at the time when the spindle 19 is rotated about a shaft according to the NC program 107 is small, therefore the rotation speed of the spindle 19 can be controlled with a high precision and in turn a high processing precision can be realized. As a result, the usefulness of correction based on the amount of deviation identified by imaging becomes high.

Note that, in the above embodiment and variations, the Y-direction is one example of the first direction. The X-direction is one example of the second direction. The Z-direction is one example of the third direction. The Y-axis drive source 29Y is one example of the first drive source. The X-axis drive source 29X is one example of the second drive source. The Z-axis drive source 29Z is one example of the third drive source. The Y-axis sensor 31Y is one example of the first sensor. The X-axis sensor 31X is one example of the second sensor. The Z-axis sensor 31Z is one example of the third sensor.

The technique according to the present disclosure is not limited to the above embodiment and variations and may be executed in various ways.

As explained also in the explanation of the embodiment, the processing machine is not limited to one having the configuration illustrated in FIG. 1. For example, the processing machine is not limited to a general machine tool. It may be a special one such as a superfine non-spherical processing machine as well. Further, the processing machine is not limited to a machine tool. It may be, for example, a robot as well. From another viewpoint, the program including the information of commands concerning movement is not limited to an NC program. It may be one generated by teaching as well. Further, for example, the processing machine may be a semiconductor manufacturing apparatus as well.

Further, the processing machine is not limited to one performing cutting, grinding, and/or polishing. For example, it may be one performing electric discharge machining as well. The processing may be one bringing the rotating tool into contact with a workpiece which is not rotating as in the embodiment (for example, milling). Otherwise, unlike the embodiment, it may be one bringing a tool which is not rotating into contact with a workpiece which is rotating (for example, turning), may be one in which both of the workpiece and the tool 101 are rotating (for example, grinding and/or polishing), or may be one in which neither the workpiece nor the tool is rotating.

The processing machine, as an axis in which the workpiece and/or tool is translated, has at least one axis which is parallel to the first direction (imaging direction). In other words, the processing machine need not have three axes relating to translations either. For example, the processing machine may have only one axis or only two axes. Conversely, it may have four or more axes as well. Further, the processing machine may include a configuration able to position the workpiece and the tool in the rotation direction.

The identification of the position in the imaging direction of the tool (or touch sensor, same below) based on the clarity is not limited to the method illustrated in the embodiment. For example, the correlation between the already explained index value showing the clarity and the distance from the camera to the tool may be checked, an arithmetic expression or map calculating the latter from the former may be found, and the position of the tool may be identified based on the arithmetic expression or map. Further, for example, AI (artificial intelligence) technology may be utilized as well. For example, it may be done to prepare a learned model by teacher data using the already explained index values showing the clarity or the images itself as inputs and using the distances from the camera to the tool as outputs and utilize this learned model to identify the position of the tool.

The control based on the position of the tool which is measured by imaging is not limited to one which can be grasped as a concept correcting the control based on the amount of deviation. For example, the imaging part is configured so as to be able to capture the tool during processing (including also the state where it is in contact with the workpiece) by making the distance between the light source and the camera long or arranging a reflection mirror at a suitable position. Further, a position measured by imaging may be utilized in the same way as a position obtained by sensors (Y-axis sensor 31Y etc. in the embodiment).

In a mode where the member (table 23 in the embodiment) which holds the workpiece moves in the absolute coordinate system, the camera (imaging part) need not be fixed to the member holding the workpiece, but may be fixed with respect to the absolute coordinate system. For example, in the embodiment, the camera may be arranged on any of the base 7, bed 21, and column 9. In this case as well, for example, the amount of deviation of the tool relative to the member provided with the camera is identified, and correction based on the amount of deviation is carried out. However, the amount of deviation of the workpiece (table) is not considered. Further, the camera may be fixed to a member which moves together with the tool as well. In this case, however, the amount of deformation included in the amount of deviation is further limited.

In relation to the above, the camera and the tool need not be able to relatively move in the first direction either. For example, in the embodiment, the tool 101 may be captured in the X-direction by the imaging part 33 fixed to the bed 21. In this case as well, for example, as already explained, the method of identifying the position of the tool from the correlation between the clarity and the position of the tool can be utilized. Further, in the second direction and third direction as well, the camera and the tool need not be able to relatively move either.

The technique according to the present disclosure makes it possible to measure the positions in three directions which are perpendicular to each other by one camera. However, one camera may be used for measurement of the position in only one direction or two directions, or two or more cameras may be provided.

REFERENCE SIGNS LIST

1 . . . processing machine, 37 . . . camera, 29Y . . . Y-axis drive source (first drive source), 45 . . . control device, 47 . . . image processing device, 101 . . . tool, and 103 . . . workpiece.

The invention claimed is:

1. A processing machine comprising:
a first drive source configured to make a workpiece and a tool relatively move in a first direction;
a second drive source configured to make the workpiece and the tool relatively move in a second direction perpendicular to the first direction;
a third drive source configured to make the workpiece and the tool relatively move in a third direction perpendicular to both of the first direction and the second direction;
a camera configured to acquire an image capturing the tool in the first direction;
an image processing device configured to:
identify a position of the tool in the first direction based on a clarity of the tool in the image,
identify a position of the tool in the second direction based on a position of the tool in the image acquired by the camera, and
identify a position of the tool in the third direction based on the position of the tool in the image acquired by the camera; and
a control device configured to:
control the first drive source based on the position of the tool in the first direction identified by the image processing device,
control the second drive source based on the position of the tool in the second direction identified by the image processing device, and
control the third drive source based on the position of the tool in the third direction identified by the image processing device.

2. The processing machine according to claim 1, further comprising:
a first sensor configured to detect relative positions of the workpiece and the tool in the first direction;
a second sensor configured to detect relative positions of the workpiece and the tool in the second direction; and
a third sensor configured to detect relative positions of the workpiece and the tool in the third direction, wherein
the control device is configured to:
perform feedback control of the first drive source based on detection values of the first sensor,
perform feedback control of the second drive source based on detection values of the second sensor, and
perform feedback control of the third drive source based on detection values of the third sensor,
the camera is arranged at a position at which it relatively moves relative to the tool in the first direction along with the relative movements of the workpiece and the tool in the first direction and acquires a plurality of images which are different from each other in relative positions relative to the tool in the first direction,
the image processing device is further configured to:
identify a first relative position of the workpiece and the tool in the first direction at which the clarity of the tool becomes the highest based on the plurality of images and the relative positions of the workpiece and the tool in the first direction which are detected by the first sensor when acquiring the plurality of images,
identify a first amount of deviation between the identified first relative position and a previously acquired relative position of the workpiece and the tool in the first direction at a time when the camera is focused on the tool,
identify a second amount of deviation between a position of the tool in the second direction at a first timing and a position of the tool in the second direction at a second timing after the first timing based on a position of the tool in the second direction in an image acquired at the first timing and a position of the tool in the second direction in an image acquired at the second timing, and
identify a third amount of deviation between a position of the tool in the third direction at a third timing and a position of the tool in the third direction at a fourth timing after the third timing based on a position of the tool in the third direction in an image acquired at the third timing and a position of the tool in the third direction in an image acquired at the fourth timing, and
the control device is further configured to:
correct the feedback control of the first drive source based on the detection value of the first sensor based on the first amount of deviation,
correct the feedback control of the second drive source based on the detection value of the second sensor based on the second amount of deviation, and
correct the feedback control of the third drive source based on the detection value of the third sensor based on the third amount of deviation.

3. The processing machine according to claim 1, wherein the image processing device is configured to:
calculate a difference of brightness from a neighboring pixel for each of a plurality of pixels in the image,
calculate an index value which becomes larger as absolute value of the differences among the plurality of pixels becomes larger, and
use the index value as an index value which becomes larger as the clarity becomes higher to thereby identify the position of the tool in the first direction.

4. The processing machine according to claim 3, wherein the image processing device is configured to calculate a value obtained by adding square values of the difference of brightness between neighboring pixels for all of the pixels in the image as the index value.

5. The processing machine according to claim 1, wherein the image processing device is configured to:
identify a maximum value and a minimum value of brightness from among a plurality of pixels in the image,
calculate an index value obtained by dividing a difference between the maximum value and the minimum value by a sum of the maximum value and the minimum value, and
use the index value as an index value which becomes larger as the clarity becomes higher to thereby identify the position of the tool in the first direction.

6. The processing machine according to claim 1, wherein the image processing device is configured to:
identify a representative value of brightness from among a plurality of pixels in the image,
calculate a difference from the representative value for each of the plurality of pixels,
calculate an index value which becomes larger as an absolute value of the difference among the plurality of pixels becomes larger, and
use the index value as an index value which becomes larger as the clarity becomes higher to thereby identify the position of the tool in the first direction.

7. The processing machine according to claim 1, further comprising an illumination device configured to illuminate the tool with light from a side opposite to the tool.

8. The processing machine according to claim 1, wherein the tool is of a rotary type, and the first direction is a direction perpendicular to a rotational axis of the tool.

9. A processing machine comprising:
a first drive source configured to make a workpiece and a tool relatively move in a first direction;
a second drive source configured to make the workpiece and the tool relatively move in a second direction perpendicular to the first direction;
a first sensor configured to detect relative positions of the workpiece and the tool in the first direction;
a camera configured to acquire an image capturing the tool in the first direction, the camera being arranged at a position at which it relatively moves relative to the tool in the first direction along with the relative movements of the workpiece and the tool in the first direction and acquires a plurality of images which are different from each other in relative positions relative to the tool in the first direction;
an image processing device configured to:
identify a position of the tool in the first direction based on a clarity of the tool in the image,
identify a position of the tool in the second direction based on a position of the tool in the image acquired by the camera,
identify a first relative position of the workpiece and the tool in the first direction at which the clarity of the tool becomes the highest based on the plurality of images and the relative positions of the workpiece and the tool in the first direction which are detected by the first sensor when acquiring the plurality of images, and
identify a first amount of deviation between the identified first relative position and a previously acquired relative position of the workpiece and the tool in the first direction at a time when the camera is focused on the tool; and
a control device configured to:
control the first drive source based on the position of the tool in the first direction identified by the image processing device,
perform feedback control of the first drive source based on detection values of the first sensor,
control the second drive source based on the position of the tool in the second direction identified by the image processing device, and
correct the feedback control of the first drive source based on the detection values of the first sensor based on the first amount of deviation.

10. The processing machine according to claim 9, further comprising:
a touch sensor which is arranged at a position having a certain positional relationship with respect to a position at which the tool is arranged, is configured to relatively move in the first direction relative to the workpiece by the first drive source by arrangement at the position having the certain positional relationship, is configured to relatively move in the first direction relative to the camera along with relative movement in the first direction relative to the workpiece, and is detected in the relative movement in the first direction relative to the workpiece by the first sensor, wherein:
the camera is further configured to capture the touch sensor in the first direction and acquire a plurality of second images in which relative positions of the camera and the touch sensor in the first direction are different from each other,
the image processing device is configured to:
identify a second relative position of the workpiece and the touch sensor in the first direction at which the clarity of the touch sensor becomes the highest based on the plurality of second images and the relative positions of the workpiece and the touch sensor in the first direction which are detected by the first sensor when acquiring the plurality of second images, and
identify a fourth amount of deviation between the identified second relative position and a previously acquired relative position of the workpiece and the touch sensor in the first direction at a time when the camera is focused on the touch sensor, and
the control device is configured to:
identify correspondence between the relative positions of the workpiece and the tool and the detection values of the first sensor based on a detection value of the first sensor at a time when abutment of the touch sensor against the workpiece is detected by the touch sensor,
correct information of the correspondence based on the fourth amount of deviation, and
perform feedback control of the first drive source based on the information of the corrected correspondence and the detection values of the first sensor.

11. A method of manufacturing a processed object, comprising:
using the processing machine according to claim 1 to bring the workpiece and the tool into contact; and
processing the workpiece into the processed object.

12. The processing machine according to claim 9, wherein the image processing device is configured to:
calculate a difference of brightness from a neighboring pixel for each of a plurality of pixels in the image,
calculate an index value which becomes larger as absolute value of the differences among the plurality of pixels becomes larger, and
use the index value as an index value which becomes larger as the clarity becomes higher to thereby identify the position of the tool in the first direction.

13. The processing machine according to claim 12, wherein the image processing device is configured to calculate a value obtained by adding square values of the difference of brightness between neighboring pixels for all of the pixels in the image as the index value.

14. The processing machine according to claim 9, wherein the image processing device is configured to:
identify a maximum value and a minimum value of brightness from among a plurality of pixels in the image,
calculate an index value obtained by dividing a difference between the maximum value and the minimum value by a sum of the maximum value and the minimum value, and
use the index value as an index value which becomes larger as the clarity becomes higher to thereby identify the position of the tool in the first direction.

15. The processing machine according to claim 9, wherein the image processing device is configured to:
identify a representative value of brightness from among a plurality of pixels in the image,
calculate a difference from the representative value for each of the plurality of pixels, calculate an index value which becomes larger as an absolute value of the difference among the plurality of pixels becomes larger, and use the index value as an index value which becomes larger as the clarity becomes higher to thereby identify the position of the tool in the first direction.

16. A processing machine comprising:

a first drive source configured to make a workpiece and a tool relatively move in a first direction;

a second drive source configured to make the workpiece and the tool relatively move in a second direction perpendicular to the first direction;

a camera configured to acquire an image capturing the tool in the first direction, the camera being arranged at a position at which it relatively moves relative to the tool in the first direction along with the relative movements of the workpiece and the tool in the first direction and acquires a plurality of images which are different from each other in relative positions relative to the tool in the first direction;

a first sensor configured to detect relative positions of the workpiece and the tool in the first direction;

a second sensor configured to detect relative positions of the workpiece and the tool in the second direction;

an image processing device configured to:
identify a position of the tool in the first direction based on a clarity of the tool in the image,
identify a position of the tool in the second direction based on a position of the tool in the image acquired by the camera,
identify a first relative position of the workpiece and the tool in the first direction at which the clarity of the tool becomes the highest based on the plurality of images and the relative positions of the workpiece and the tool in the first direction which are detected by the first sensor when acquiring the plurality of images,
identify a first amount of deviation between the identified first relative position and a previously acquired relative position of the workpiece and the tool in the first direction at a time when the camera is focused on the tool, and
identify a second amount of deviation between a position of the tool in the second direction at a first timing and a position of the tool in the second direction at a second timing after the first timing based on a position of the tool in the second direction in an image acquired at the first timing and a position of the tool in the second direction in an image acquired at the second timing; and a control device configured to:
control the first drive source based on the position of the tool in the first direction identified by the image processing device,
control the second drive source based on the position of the tool in the second direction identified by the image processing device,
perform feedback control of the first drive source based on detection values of the first sensor,
perform feedback control of the second drive source based on detection values of the second sensor,
correct the feedback control of the first drive source based on the detection value of the first sensor based on the first amount of deviation, and
correct the feedback control of the second drive source based on the detection value of the second sensor based on the second amount of deviation.

17. The processing machine according to claim 16, wherein the image processing device is configured to:
calculate a difference of brightness from a neighboring pixel for each of a plurality of pixels in the image,
calculate an index value which becomes larger as absolute value of the differences among the plurality of pixels becomes larger, and
use the index value as an index value which becomes larger as the clarity becomes higher to thereby identify the position of the tool in the first direction.

18. The processing machine according to claim 17, wherein the image processing device is configured to calculate a value obtained by adding square values of the difference of brightness between neighboring pixels for all of the pixels in the image as the index value.

19. The processing machine according to claim 16, wherein the image processing device is configured to:
identify a maximum value and a minimum value of brightness from among a plurality of pixels in the image,
calculate an index value obtained by dividing a difference between the maximum value and the minimum value by a sum of the maximum value and the minimum value, and
use the index value as an index value which becomes larger as the clarity becomes higher to thereby identify the position of the tool in the first direction.

20. The processing machine according to claim 16, wherein the image processing device is configured to:
identify a representative value of brightness from among a plurality of pixels in the image,
calculate a difference from the representative value for each of the plurality of pixels,
calculate an index value which becomes larger as an absolute value of the difference among the plurality of pixels becomes larger, and
use the index value as an index value which becomes larger as the clarity becomes higher to thereby identify the position of the tool in the first direction.

* * * * *